US012479090B2

(12) United States Patent
Jha et al.

(10) Patent No.: US 12,479,090 B2
(45) Date of Patent: Nov. 25, 2025

(54) SYSTEM AND METHOD FOR CONTROLLING A ROBOTIC MANIPULATOR BASED ON HIERARCHICAL REINFORCEMENT LEARNING OF CONTROL POLICIES

(71) Applicant: Mitsubishi Electric Research Laboratories, Inc., Cambridge, MA (US)

(72) Inventors: Devesh Jha, Cambridge, MA (US); Shivam Vats, Pittsburg, PA (US); Diego Romeres, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 86 days.

(21) Appl. No.: 18/616,614

(22) Filed: Mar. 26, 2024

(65) Prior Publication Data

US 2025/0303556 A1 Oct. 2, 2025

(51) Int. Cl.
*B25J 9/16* (2006.01)

(52) U.S. Cl.
CPC ........... *B25J 9/161* (2013.01); *B25J 9/163* (2013.01); *B25J 9/1697* (2013.01)

(58) Field of Classification Search
CPC .......... B25J 9/161; B25J 9/163; B25J 9/1697
USPC ............... 700/245–264; 318/568.11–568.25
See application file for complete search history.

(56) References Cited

U.S. PATENT DOCUMENTS

| 11,120,365 B2 * | 9/2021 | Campos .............. G06F 9/5066 |
| 11,429,895 B2 * | 8/2022 | Yakovlev ............. G06N 5/01 |
| 11,620,568 B2 * | 4/2023 | Moghadam ........... G06N 3/045 |
| | | 706/12 |
| 11,734,575 B2 * | 8/2023 | Agravante ............ G06N 3/088 |
| | | 706/21 |
| 11,889,819 B2 * | 2/2024 | Worth .................. G06F 18/217 |
| 11,928,764 B2 * | 3/2024 | Wang .................... G06T 13/20 |
| 12,156,512 B2 * | 12/2024 | Worth .................... G06N 7/01 |
| 12,259,950 B2 * | 3/2025 | Dai ..................... G06F 18/2178 |

(Continued)

OTHER PUBLICATIONS

Morimoto et al, Acquisition of stand-up behavior by a real robot using hierarchical reinforcement learning, 2001, Elsevier, Robotics and Autonomous Systems 36 (2001) 37-51 (Year: 2001).*

(Continued)

*Primary Examiner* — Jaime Figueroa
(74) *Attorney, Agent, or Firm* — Gene Vinokur

(57) ABSTRACT

A feedback controller for controlling a robotic manipulator to perform a task is provided. The feedback controller comprises a memory configured to store a hierarchical reinforcement learning (HRL) neural network including (i) nominal control policy, and (ii) recovery control policy. The recovery control policy is trained based on a recovery policy reward to select a switch-to-nominal action to transfer control to the nominal control policy to perform the task. The recovery policy reward is dependent on a nominal policy reward for training the nominal control policy. The feedback controller further comprises a processor configured to iteratively execute the HRL neural network to select at least one of a nominal action based on the nominal control policy, and a recovery action based on the recovery control policy and to control the robotic manipulator to perform the task based on the selected action.

22 Claims, 23 Drawing Sheets

(56) References Cited

U.S. PATENT DOCUMENTS

| | | | | |
|---|---|---|---|---|
| 2007/0094187 | A1* | 4/2007 | Anderson | G06N 20/00 706/45 |
| 2018/0293498 | A1* | 10/2018 | Campos | G06F 8/38 |
| 2018/0357552 | A1* | 12/2018 | Campos | G06N 5/043 |
| 2020/0034704 | A1* | 1/2020 | Agravante | G06N 3/045 |
| 2021/0187737 | A1* | 6/2021 | Fujimoto | B25J 9/1661 |
| 2021/0279525 | A1* | 9/2021 | Goyal | G06V 10/776 |
| 2023/0101777 | A1* | 3/2023 | Worth | G06N 20/00 340/573.3 |
| 2023/0103420 | A1* | 4/2023 | Worth | G06Q 50/02 119/14.08 |
| 2023/0128610 | A1* | 4/2023 | Yerushalmi | G06F 17/18 706/12 |
| 2023/0392206 | A1* | 12/2023 | Nalls | A61K 31/41 |
| 2024/0028948 | A1* | 1/2024 | Worth | G06N 3/008 |
| 2024/0069501 | A1* | 2/2024 | Cherian | G05B 13/027 |
| 2024/0224944 | A1* | 7/2024 | Worth | G06F 18/217 |
| 2024/0227181 | A9* | 7/2024 | Lee | B25J 9/1679 |
| 2024/0289639 | A1* | 8/2024 | Worth | G06N 3/006 |
| 2024/0300096 | A1* | 9/2024 | Cherian | B25J 13/003 |
| 2025/0164966 | A1* | 5/2025 | Emukpere | B25J 9/163 |

OTHER PUBLICATIONS

Liu et al, Hierarchical Reinforcement Learning Integrating With Human Knowledge for Practical Robot Skill Learning in Complex Multi-Stage Manipulation, 2023, IEEE Transactions on Automation Science and Engineering, vol. 21, https://doi.org/10.1109/TASE.2023.3288037 (Year: 2023).*

Yang et al, Hierarchical Reinforcement Learning With Universal Policies for Multistep Robotic Manipulation,2022, IEEE Transactions on Neural Networks and Learning Systems, vol. 33, No. 9, Sep. 2022; https://doi.org/10.1109/TNNLS.2021.3059912 (Year: 2022).*

Liu et al, A Brief Review of Recent Hierarchical Reinforcement Learning for Robotic Manipulation, 2022, IEEE, 2022 10th International Conference on Information Systems and Computing Technology (ISCTech), DOI 10.1109/ISCTech58360.2022.00119 (Year: 2022).*

* cited by examiner

700a

| 701 | 1 | procedure LearnRecovery($\xi$) |
| --- | --- | --- |
| 703 | 2 | $\mathcal{D}_{fail} \leftarrow$ execute nominal policies k times and record failures |
| 705 | 3 | $V^{nom} \leftarrow$ learn value function of nominal policies |
| 707 | 4 | $\{\mathcal{D}_{fail}^1, ..., \mathcal{D}_{fail}^m\} \leftarrow$ cluster $\mathcal{D}_{fail}$ |
|  | 5 | $\Pi_r \leftarrow \emptyset$ |
| 709 | 6 | for $i \in \{1, ..., m\}$ do |
|  | 7 | $\quad \pi_r^i, I \leftarrow$ LearnRobustSkill($\mathcal{D}_{fail}^i$) |
|  | 8 | $\quad \Pi_r \leftarrow \Pi_r \cup \{\pi_r^i\}$ |

FIG. 7A 1  procedure LearnRobustSkill($\mathcal{D}_{fail}$)
2  $\mathcal{A}_{avg} \leftarrow \mathcal{A} \cup \{\Pi^{nom}\}$  ▷ augmented action space
3  $r(s, a, s') \leftarrow f_{goal}(s) + V^{nom}(s) - V^{nom}(s')$
4  $\mathcal{M} := (\mathcal{S}, \mathcal{A}_{aug}, r, T, \gamma, \mathcal{D}_{fail})$
5  $\pi_r \leftarrow$ train a policy for the MDP $\mathcal{M}$
6  $I \leftarrow \{s \in \mathcal{D}_{fail} \mid \rho(s) > \theta\}$ ▷ robust initiation set
7  return $\pi_r, I$

FIG. 7B 1 procedure Step(s, a)
2   If $a$ is a switch action $a_i^{switch}$ then
3     $s' \leftarrow$ execute the nominal skills $\{\pi_i^{nom}, ..., \pi_k^{nom}\}$
4     terminate episode
5   else
6     for $i \in \{1, ..., m\}$ do
7       $s' \leftarrow$ execute action $a$
8   return $s', f_{goal}(s')$

FIG. 7C

SYSTEM AND METHOD FOR CONTROLLING A ROBOTIC MANIPULATOR BASED ON HIERARCHICAL REINFORCEMENT LEARNING OF CONTROL POLICIES

TECHNICAL FIELD

The present disclosure relates generally to robotic manipulation, and more particularly to a system and a method for controlling a robotic manipulator based on hierarchical reinforcement learning of control policies to perform one or more tasks.

BACKGROUND

Robotic manipulators are widely used in one or more tasks, for example, manufacturing tasks, assembly tasks, repetitive tasks, surgical tasks, search and rescue tasks, and mining tasks. A robotic manipulator consists of an end effector equipped with various sensors, for example, camera sensors, tactile sensors, and force sensors, to perceive an environment and perform the one or more tasks. Generally, one or more states associated with the environment can be partially observable, thereby leading to a planning and a control of the robotic manipulator in partially observable environments.

For example, the robotic manipulator is configured to perform a book placing task corresponding to a bookshelf. Further, a full state for the book placing task is described by a state of the robotic manipulator, a state of the end effector, a state of the book picked by the end effector, and a state of the bookshelf indicative of a pose of the book in the bookshelf and a pose of other objects in the bookshelf. However, the full state of the book placing task may change to a partially observable state due to a lack of sensor data or occlusions. Hence, there is a need to control the robotic manipulator to perform the book placing task in the partially observable state.

Additionally, the planning and the control of the robotic manipulator in a belief state is challenging due to dynamics uncertainty, a non-markovian decision making, continuous search spaces, and a high computation cost. Further, contact-rich environments incorporate challenges in the planning and the control due to sudden contacts, leading to collisions and slips. In addition, robotic manipulation is an under-actuated problem, thus, the robotic manipulation in the partially observable environments increase the challenges.

Some challenges associated with a manipulator include configuring a controller to perform long horizon manipulation tasks with novel objects in the partially observable environments.

Some methods use various trained policies to control the robotic manipulator to perform the long horizon manipulation tasks with the novel objects. However, as mechanics of objects during manipulation depend on object properties, for example, an object geometry, an object size, an object density, and the like, it is challenging to use a naïve policy for the long-horizon manipulation tasks with the novel objects. Thus, a training in the various policies or various controllers that can control the robotic manipulator in the partially observable environments is very challenging due to aforementioned challenges.

Accordingly, there is a need for a system and a method for controlling the robotic manipulator to perform the one or more tasks in the partially observable environments.

SUMMARY

It is an objective of some embodiments to mitigate failures, for example, collisions, slips, and the like, occurring between a robotic manipulator of a feedback controller and an object to be manipulated by the robotic manipulator during performing one or more tasks in partially observable environments by using various polices and various controllers. It is also an object of some embodiments to train the various policies and the various controllers to perform the one or more tasks in the partially observable environments.

Some embodiments are based on an understanding that a plurality of nominal control policies can be trained to execute a set of skill actions in nominal conditions and a plurality of recovery control policies can be trained to recover from failures occurring in the partially observable environments and allows the robotic manipulator to perform the task. Further, each skill action of the set of skill actions corresponds to a micro-task, for example, a pick-up task, a move task, a rotation task, and the like. Additionally, a high level policy of a plurality of high level policies is configured to select and execute a nominal control policy in response to (i) the nominal control policy generating a nominal action that transitions the robotic manipulator in a termination state region or (ii) in response to the recovery control policy generating a switch-to-nominal action transferring control to the nominal control policy.

Further, the high-level policy is configured to select the recovery control policy in response to at least one of: (i) the nominal control policy generating the nominal action that transitions the robotic manipulator in the failure state region and (ii) the recovery control policy generating an action different from the switch-to-nominal action.

Some embodiments are based on a realization that at least one hierarchical reinforcement learning (HRL) algorithm can be employed to determine and train recovery control policies for performing the one or more tasks. In some embodiments, the at least one HRL algorithm can be employed by an HRL controller that is configured to switch between an execution of a nominal motion controller and a recovery motion controller to perform the one or more tasks. However, a determination and a training of recovery control policies is challenging as there is a need to determine an initiation set and a termination set for each policy of the set of nominal control policies and the set of recovery control policies. Additionally or alternatively, trained recovery control policies can fail due to a long planning horizon and partially observable states associated with the partially observable environments.

To that end, some embodiments are based on an objective to determine and train the HRL controller by iteratively executing the set of nominal control polices and the set of recovery control polices in an augmented action space with simulated full state data to achieve a goal state indicative of a completion of the one or more task. Further, the simulated full state data includes simulated robotic manipulator data, simulated object data, and simulated environment data. Further, some embodiments are based on an objective to perform, using the trained recovery control policies of the set of recovery control policies, an iterative switching action between the execution of the nominal motion controller and the execution of the recovery motion controller to perform the one or more tasks.

Accordingly, one embodiment discloses a feedback controller for controlling a robotic manipulator to perform a task. The feedback controller comprises a user interface, a memory and a processor. The user interface is configured to collect a feedback signal indicative of measurements of a state of the robotic manipulator performing the task. The memory is configured to store a hierarchical reinforcement learning (HRL) neural network including (i) a nominal control policy trained to generate, based on the feedback signal, a nominal action transitioning the robotic manipulator in a precondition state region to a termination state region of the task and (ii) a recovery control policy trained to generate, based on at least a portion of the feedback signal, a recovery action transitioning the robotic manipulator in a failure state region to the precondition state region of the nominal control policy, wherein the recovery control policy is trained based on a recover policy reward to generate a switch-to-nominal action to transfer control to the nominal control policy to perform the task, wherein the recovery policy reward for training the recovery control policy is dependent on a nominal policy reward for training the nominal control policy. The processor is configured to iteratively execute the HRL neural network to generate an action from at least one of: the nominal action or the recovery action. The processor is further configured to cause to control the robotic manipulator to perform the task based on the generated action.

Another embodiment discloses a method for controlling a robotic manipulator to perform a task. The method employs a processor coupled to a memory configured to store a hierarchical reinforcement learning (HRL) neural network including (i) a nominal control policy trained to generate, based on the feedback signal, a nominal action transitioning the robotic manipulator in a precondition state region to a termination state region of the task and (ii) a recovery control policy trained to generate, based on at least a portion of the feedback signal, a recovery action transitioning the robotic manipulator in a failure state region to the precondition state region of the nominal control policy, wherein the recovery control policy is trained based on a recover policy reward to generate a switch-to-nominal action to transfer control to the nominal control policy to perform the task, wherein the recovery policy reward for training the recovery control policy is dependent on a nominal policy reward for training the nominal control policy. The processor is configured to iteratively execute the HRL neural network to generate an action from at least one of: the nominal action or the recovery action. The processor is further configured to cause to control the robotic manipulator to perform the task based on the generated action. The method includes collecting a feedback signal indicative of measurements of a state of the robotic manipulator performing the task. The method further includes executing the HRL neural network to generate an action from at least one of: the nominal action or the recovery action. The method further includes causing to control the robotic manipulator to perform the task based on the generated action.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7A illustrates a policy learning algorithm for determining the set of recovery control policies, in accordance with one or more example embodiments;

FIG. 7B illustrates a skill learning algorithm for training the recovery control policies of the set of recovery control policies, in accordance with one or more example embodiments;

FIG. 7C illustrates a reward algorithm for training the recovery control policies of the set of recovery control policies, in accordance with one or more example embodiments;

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
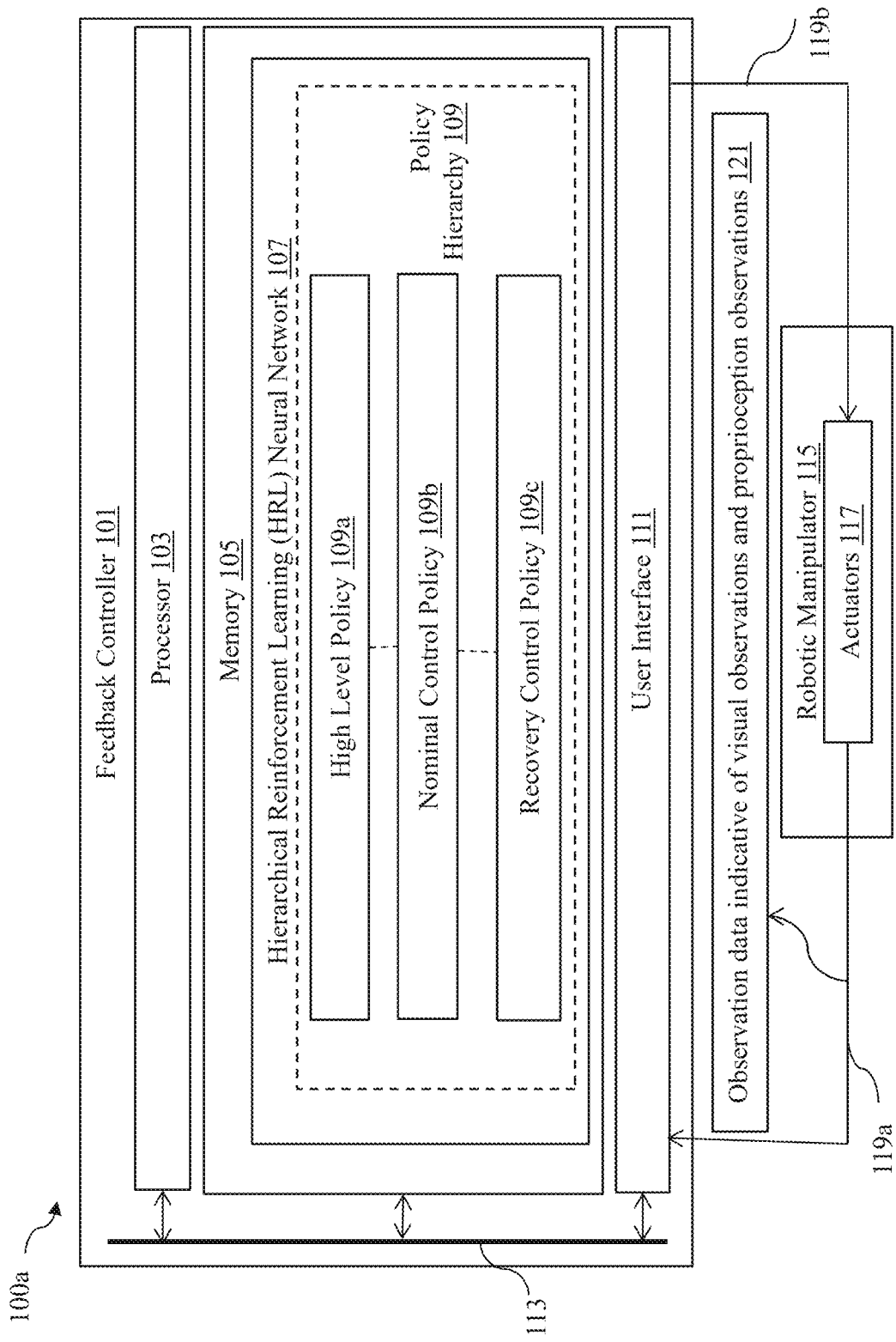
FIG. 1A illustrates a block diagram of a feedback controller for controlling a robotic manipulator, in accordance with one or more example embodiments.

FIG. 1A illustrates a block diagram 100a of a feedback controller 101 for controlling a robotic manipulator 115, in accordance with one or more example embodiments. The feedback controller 101 is configured to control the robotic manipulator 115 to perform a task. The task includes one or a combination of a manufacturing task, an assembly task, a repetitive task, a surgical task, a search and rescue task, and a mining task. In some embodiments, the task is defined by a sequence of skill actions in a time domain. Further, in some embodiments, the task may be referred to as a sequence of state/action pairs to be executed, by the robotic manipulator 115, in the time domain.

The feedback controller 101 comprises a processor 103, a memory 105, a user interface 111, a bus 113, and is communicatively coupled to the robotic manipulator 115. The memory 105 comprises a hierarchical reinforcement learning (HRL) neural network 107. The HRL neural network 107 includes a policy hierarchy 109. The policy hierarchy 109 includes a high level policy 109a, a nominal control policy 109b, and a recovery control policy 109c. Further, the recovery control policy 109c is a subtask of the nominal control policy 109b, and the nominal control policy 109b is dominant over the recovery control policy 109c.

The robotic manipulator 115 further includes one or more actuators 117. For ease of explanation, the one or more actuators 117 are shown integrated within the robotic manipulator 115. However, the one or more actuators 117 may be coupled in an alternate equivalent arrangement from the robotic manipulator 115.

Further, the robotic manipulator 115 may comprise a plurality of joints, and an end effector. In some embodiments, the end effector may be referred to as "gripper". Further, the end effector may comprise one or more fingers. Further, the one or more fingers may be assembled in one or a combination of configurations and may be associated with one or more sensors to control one or more operations of the robotic manipulator 115. Further, in some embodiments, the one or more sensors include one or a combination of tactile sensors, pressure sensors, and torque sensors.

The user interface 111 is configured to collect a feedback signal 119a indicative of measurements of a state of the robotic manipulator 115. In some embodiments, the feedback signal 119a includes observation data 121 indicative of visual observations and proprioception observations associated with the robotic manipulator 115. In some embodiments, the processor 103 is configured to iteratively execute the HRL neural network 107, based on the state of the robotic manipulator 115 in a precondition state region, to generate a plurality of actions corresponding to a long horizon period of execution time associated with the task. In some embodiments, the processor 103 is configured to determine, based on a comparison of an anticipated execution time associated with the task with a predetermined threshold, the long horizon period of execution time associated with the task. The predetermined threshold is associated with an optimal time period associated with execution of the task.

In some embodiments, the nominal control policy 109b is trained to generate, based on the feedback signal 119a, a nominal action transitioning the robotic manipulator 115 in a precondition state region to a termination state region of the task. Accordingly, a schematic is provided with reference to FIG. 1B.

Further, the recovery policy 109c is trained to generate, based on at least a portion of the feedback signal 119a, a recovery action transitioning the robotic manipulator 115 in a failure state region to the precondition state region of the nominal control policy 109b. Accordingly, a schematic is provided with reference to FIG. 1C.

In some embodiments, the processor 103 is further configured to iteratively execute the HRL neural network 107 to generate an action from at least one of: the nominal action and the recovery action. In some embodiments, the processor 103 is further configured to cause to control the robotic manipulator 115 to perform the task based on the generated action.

In some embodiments, the processor 103 is further configured to generate, based on the generated action, one or more control commands 119b to control one or more actuators 117 of the robotic manipulator 115.

In some embodiments, the one or more control commands 119b may be associated with physical quantities such as voltages, pressures, forces, torques, and the like. Additionally or alternatively, the one or more control commands 119b may correspond to movement of the robotic manipulator 115 according to reference trajectories. In some embodiments, one or more controllers are configured to determine the one or more control commands 119b to change the state of the robotic manipulator 115 for performing the task by tracking the reference trajectories.

In some embodiments, the processor 103 is further configured to iteratively transmit the one or more control commands 119b and collect the feedback signal 119a.

In some embodiments, the processor 103 is further configured to cause the HRL neural network 107 to apply control polices in the policy hierarchy 109, for example, the high level policy 109a, the nominal control policy 109b, and the recovery control policy 109c to determine the one or more control commands 119b.

Specifically, the high level policy 109a is configured to iteratively execute at least one of: the nominal control policy 109b or the recovery control policy 109c to perform the task. Further, the high level policy 109a is further configured to execute the nominal control policy 109b to determine the one or more control commands 119b in nominal conditions. The nominal conditions may correspond to anticipated operating conditions of the robotic manipulator 115. The nominal conditions may indicate a normal state in which the robotic manipulator 115 may perform the one or more tasks optimally.

Further, the high level policy 109a is configured to execute the recovery control policy 109c to generate the one or more control commands 119b in failure conditions. The failure conditions may correspond to a deviation associated with the anticipated operating conditions of the robotic manipulator 115. The failure conditions may lead to a failure in completion of the task.

In some embodiments, the user interface 111 is configured to transmit the one or more control commands 119b to the one or more actuators 117. Further, based on the one or more control commands 119b, the one or more actuators 117 are configured to change the state of the robotic manipulator 115. In an example embodiment, the change in the state of the task may indicate a change from an object picking state to an object placing state. In another example embodiment, the change in the execution state may indicate a change from the object placing state to a collision state.

In some embodiments, the user interface 111 is further configured collect the feedback signal 119a indicative of the change in the state of the robotic manipulator 115. Additionally or alternatively, the measurements indicate the change in the state of the robotic manipulator 115 corresponding to the one or more control commands 119b.

In some embodiments, the HRL neural network 107 is further configured to cause the high level policy 109a to iteratively execute, based on the feedback signal 119a, the at least one of: the nominal control policy 109b, or the recovery control policy 109c.

Further, the high level policy 109a is further configured to switch between an execution of the nominal control policy 109b and an execution of the recovery control policy 109c to mitigate failures and complete the task. In some embodiments, the high level policy 109a is further configured to iteratively switch between the execution of the nominal control policy 109b and the execution of the recovery control policy 109c.

In some embodiments, the memory 105 may be non-transitory and may include, for example, one or more volatile and/or non-volatile memories. In other words, for example, the memory 105 may be an electronic storage device (for example, a computer readable storage medium) comprising gates configured to store data (for example, bits) that may be retrievable by a machine (for example, a computing device like the processor 103). The memory 105 may be configured to store information, data, content, applications, instructions, or the like, for enabling the apparatus to carry out various functions in accordance with an example embodiment of the present disclosure.

For example, the memory 105 may be configured to buffer input data for processing by the processor 103. The memory 105 may be configured to store instructions for execution by the processor 103. As such, whether configured by hardware or software methods, or by a combination thereof, the processor 103 may represent an entity (for example, physically embodied in circuitry) capable of performing operations according to an embodiment of the present disclosure while configured accordingly. Thus, for example, when the processor 103 is embodied as an application specific integrated circuit (ASIC), a field programmable gate array (FPGA) or the like, the processor 103 may be specifically configured hardware for conducting the operations described herein. Alternatively, as another example, when the processor 103 is embodied as an executor of software instructions, the instructions may specifically configure the processor 103 to perform the algorithms and/or operations described herein when the instructions are executed. However, in some cases, the processor 103 may be a processor specific device (for example, a mobile terminal or a fixed computing device) configured to employ an embodiment of the present disclosure by further configuration of the processor 103 by instructions for performing the algorithms and/or operations described herein. The processor 103 may include, among other things, a clock, an arithmetic logic unit (ALU) and logic gates configured to support operation of the processor 103.

Further, in some embodiments, the nominal control policy 109b is further configured to map the measurement to the generated nominal action selected from a set of skill actions defining an action space of the robotic manipulator 115. Accordingly, a schematic is provided with reference to FIG. 1B.

Figure 1B:
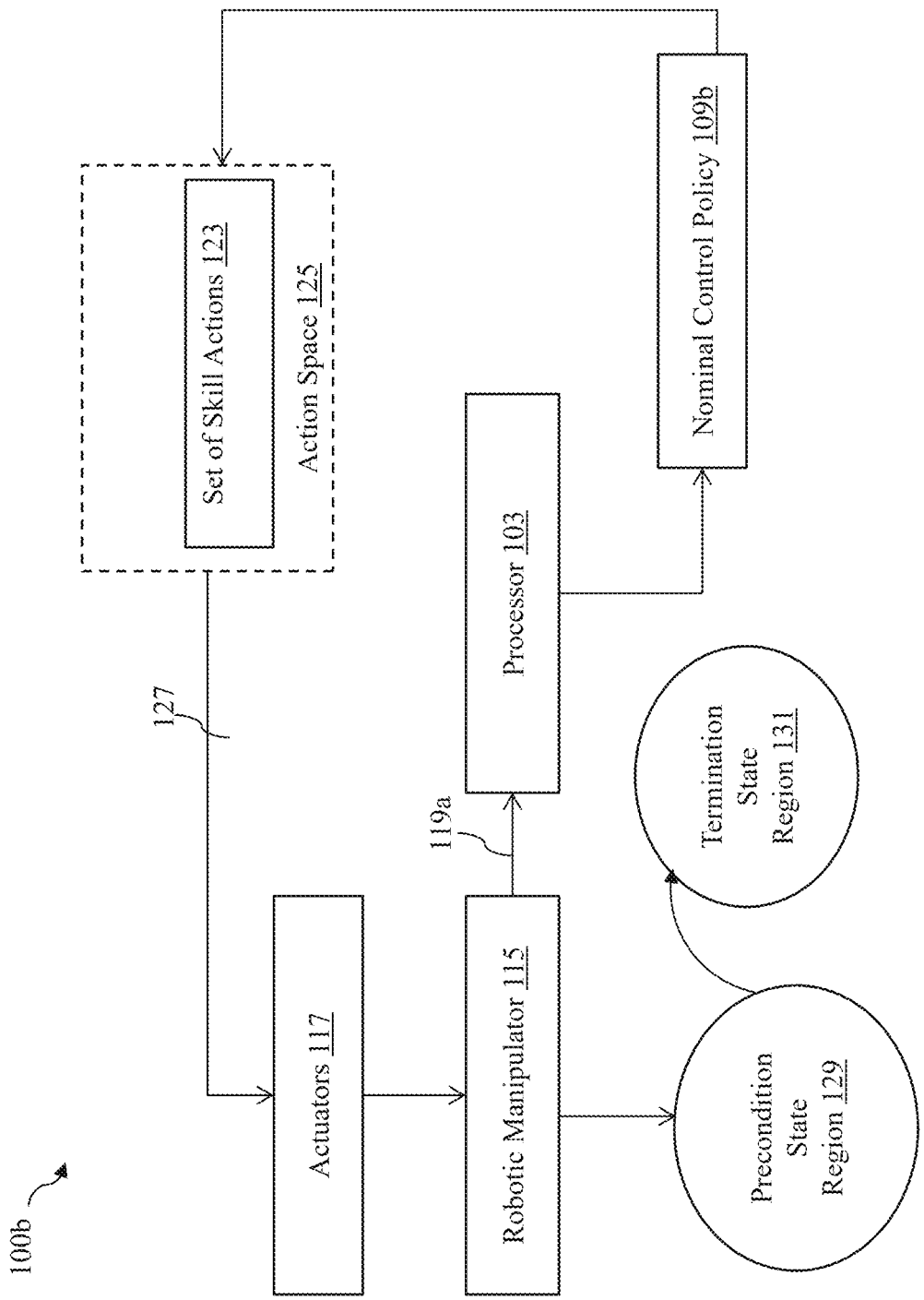
FIG. 1B illustrates a schematic of a nominal action used by some embodiments for controlling the robotic manipulator, in accordance with one or more example embodiments.

FIG. 1B illustrates a schematic 100b of generating a nominal action 127 for controlling the robotic manipulator 115, in accordance with one or more example embodiments.

As shown in FIG. 1B, the nominal control policy 109b is configured to generate, based on the feedback signal 119a indicative of the measurements of the state of the robotic manipulator 115, the nominal action 127 transitioning the robotic manipulator 115 in a precondition state region 129 to a termination state region 131. The nominal action 127 is selected from an action space 125 of the robotic manipulator. The action space 125 is defined by a set of skill actions 123. Further, the nominal control policy 109b is further configured to map the measurements corresponding to the feedback signal 119a to the generated nominal action 127 selected from the set of skill actions 123. The set of skill actions 123 is further explained in detail with reference to FIG. 1C. In some embodiments, the nominal control policy 109b is further configured to select, based on the visual observations and the proprioception observations, the nominal action 127 from the set of skill actions 123 transitioning the robotic manipulator 115 in the precondition state region 129 to the termination state region 131. To that end, the nominal action 127 causes the actuators 117 of the robotic manipulator 115 to transition the robotic manipulator 115 from the precondition state region 129 to the termination state region 131.

Figure 1C:
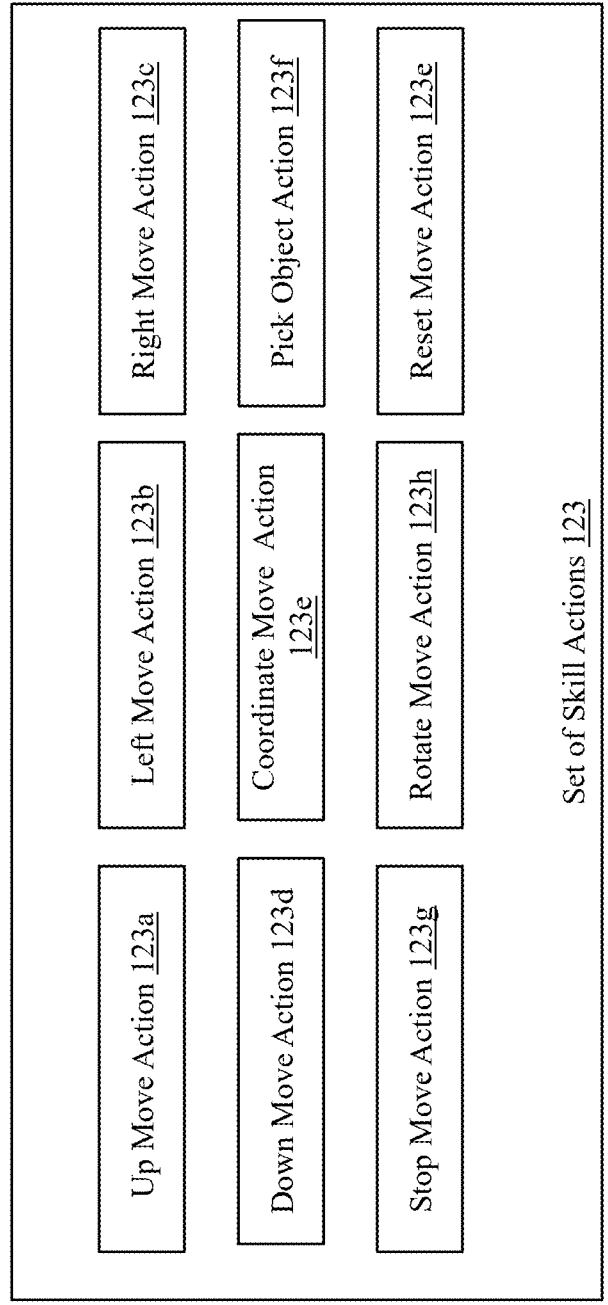
FIG. 1C illustrates a schematic of a set of skill actions used for controlling the robotic manipulator, in accordance with one or more example embodiments.

FIG. 1C illustrates a block diagram 100c of the set of skill actions 123, according to some embodiments of the present disclosure. As shown in FIG. 1C, the set of skill actions 123 includes at least one of: an up move action 123a, a left move action 123b, a right move action 123c, a down move action 123d, a coordinate move action 123e, a pick object action 123f, a stop move action 123g, a rotate move action 123h, a reset position action 123e, and any combination thereof.

The up move action 123a corresponds to an upward movement operation of the robotic manipulator 115. The left move action 123b corresponds to a leftward movement operation of the robotic manipulator 115. The right move action 123c corresponds to a rightward movement operation of the robotic manipulator 115. The down move action 123d corresponds to a downward movement operation of the robotic manipulator 115. The coordinate move action 123e corresponds to a coordinate based movement operation of the robotic manipulator 115. The pick object action 123f corresponds to an object picking operation of the robotic manipulator 115. The stop move action 123g corresponds to a stop movement operation of the robotic manipulator 115.

The reset move action 123e corresponds to a reset position movement operation of the robotic manipulator 115.

In some embodiments, the robotic manipulator 115 is associated with an augmented action space which is an augmented version of the action space 125 corresponding to the set of skill actions 123.

In some embodiments, the recovery control policy 109c is further configured to map at least a portion of the feedback signal 119a to the generated recovery action selected from an augmented set of skill actions defining the augmented action space of the robotic manipulator 115. Accordingly, a schematic is provided with reference to FIG. 1D.

Figure 1D:
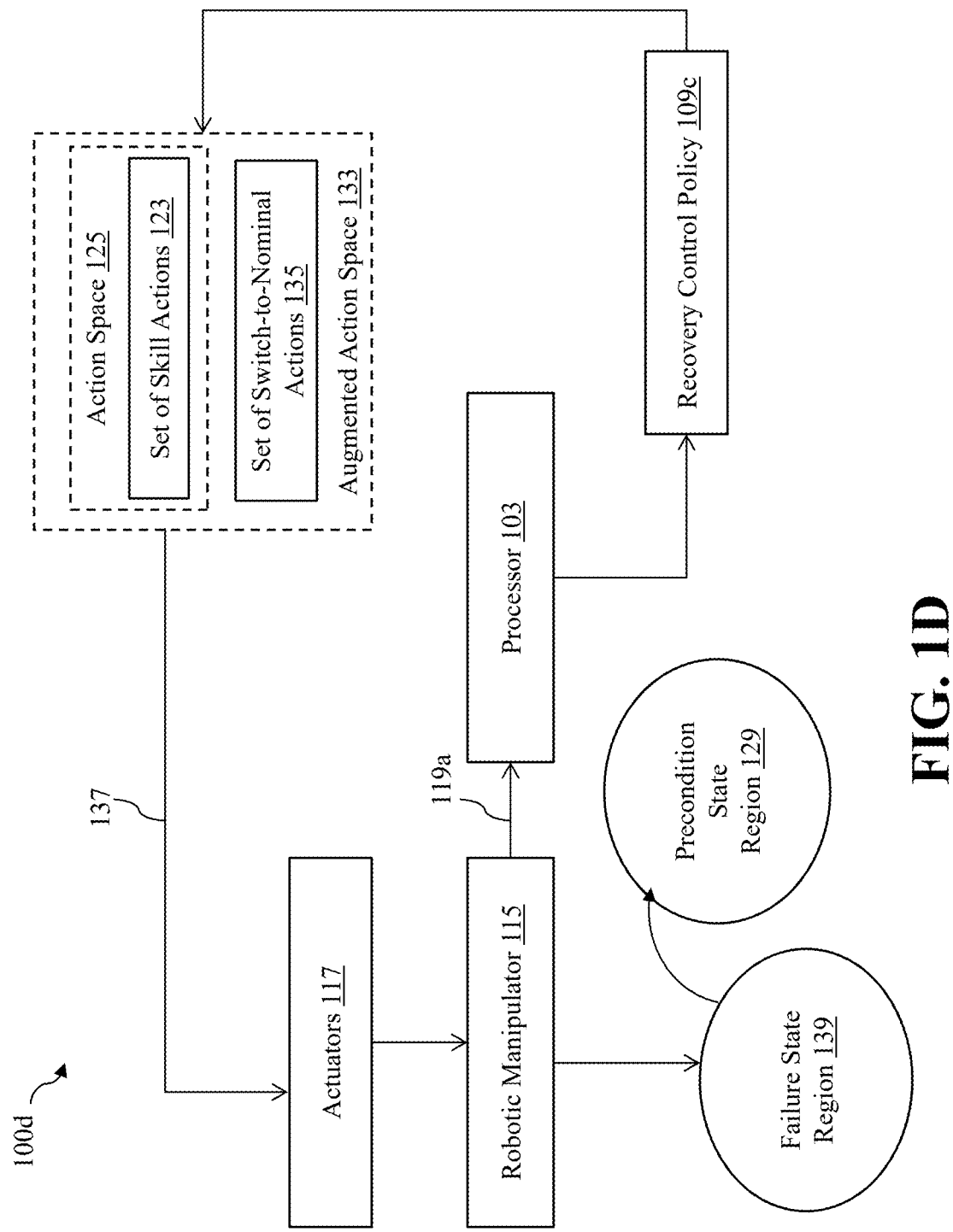
FIG. 1D illustrates a schematic of a recovery action used by some embodiments for controlling the robotic manipulator, in accordance with one or more example embodiments.

FIG. 1D illustrates a schematic 100d of a recovery action 137 for controlling the robotic manipulator 115, in accordance with one or more example embodiments. As shown in FIG. 1D, the recovery control policy 109c is further configured to generate, based on at least a portion of the feedback signal 119a, the recovery action 137 transitioning the robotic manipulator 115 in a failure state region 139 to the precondition state region 129 of the nominal control policy 109b. The recovery control policy 109c is configured to map at least a portion of the measurements 119a to the generated recovery action 137 selected from an augmented action space 133 of the robotic manipulator 115. Additionally or alternatively, the recovery control policy 109c is further configured to select, based on the proprioception observations, the recovery action 137 from the augmented action space 133 transitioning the robotic manipulator 115, through the actuators 117, in the failure state region 139 to the precondition state region 129. The augmented action space 133 comprises a set of switch-to-nominal actions 135, in addition to the set of skill actions 123 of the action space 125.

Figure 1E:
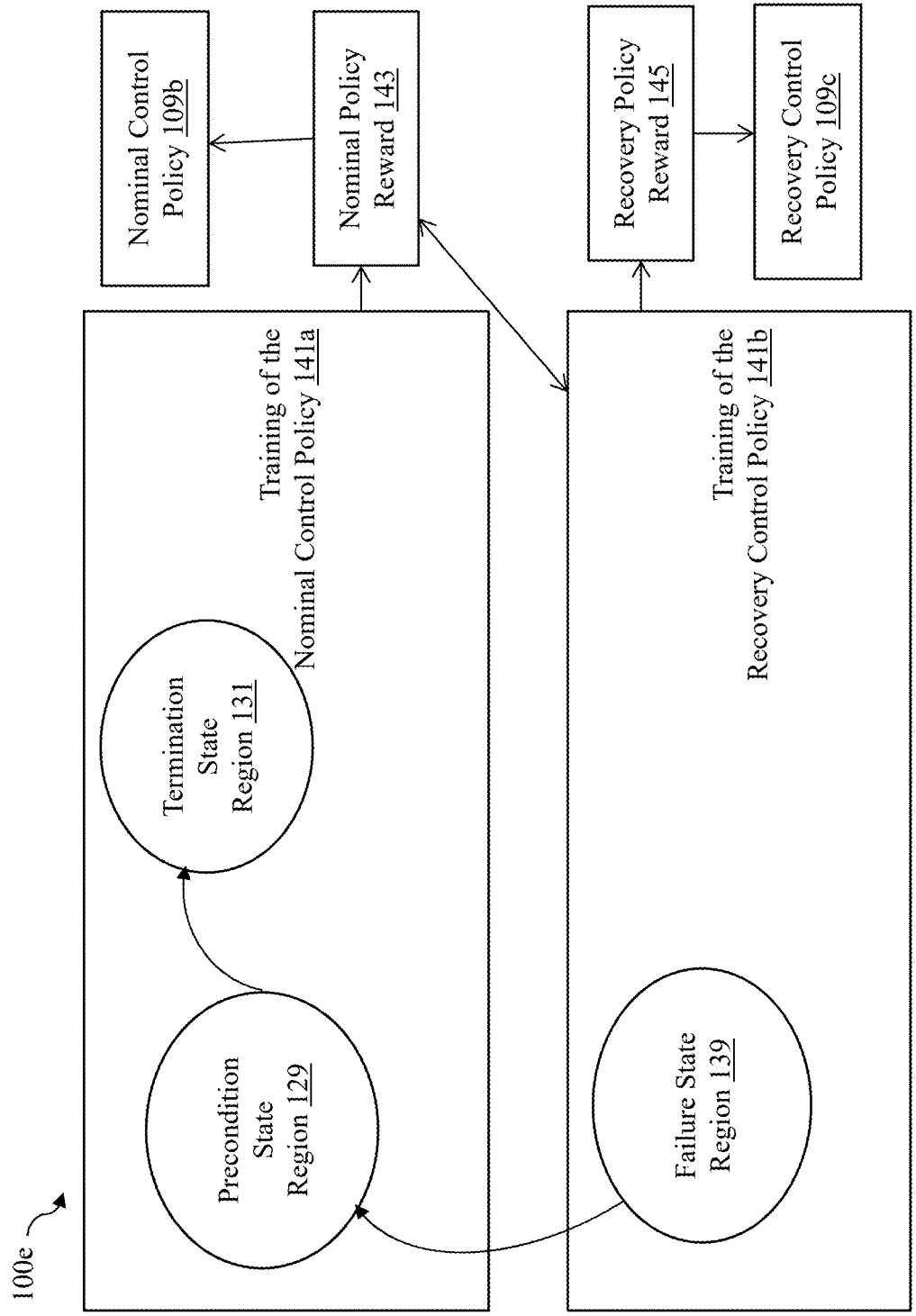
FIG. 1E illustrates a schematic that illustrates an example embodiment of training of control policies, in accordance with one or more example embodiments.

FIG. 1E illustrates a schematic that illustrates an example of a training 100e of control policies, in accordance with one or more example embodiments. As shown in FIG. 1E, the training 100e of the control policies includes a training 141a of the nominal control policy for transitioning of the robotic manipulator 115 in the precondition state region 129 to the termination state region 131. In some embodiments, the processor 103 is further configured to generate a nominal policy reward 143 corresponding to the transitioning of the robotic manipulator 115 in the precondition state region 129 to the termination state region 131. In some embodiments, the processor 103 is further configured to iteratively re-train the nominal control policy 109b based on the nominal policy reward 143. Further, the training 100e of the control policies includes a training 141b of the recovery control policy for transitioning the robotic manipulator 115 in the failure state region 139 to the precondition state region 129.

In some embodiments, the recovery control policy 109c is trained based on the recovery policy reward 145 to generate a switch-to-nominal action to transfer control to the nominal control policy 109b to perform the task. The switch-to-nominal action is described in detail with reference to FIG. 1F. Further, the recovery policy reward 145 for training 141b the recovery control policy 109c is dependent on the nominal policy reward 143 for training 141a the nominal control policy 109b. In some embodiments, the processor 103 is further configured to determine the recovery policy reward 145 based on the nominal policy reward 143 generated corresponding to the transitioning of the robotic manipulator 115 to the termination state region 131 from the precondition state region 129.

In some embodiments, the high-level policy 109a is configured to iteratively switch between the execution of the nominal control policy 109a and the execution of the recovery control policy 109c. Accordingly a schematic is provided with reference to FIG. 1F.

Figure 1F:
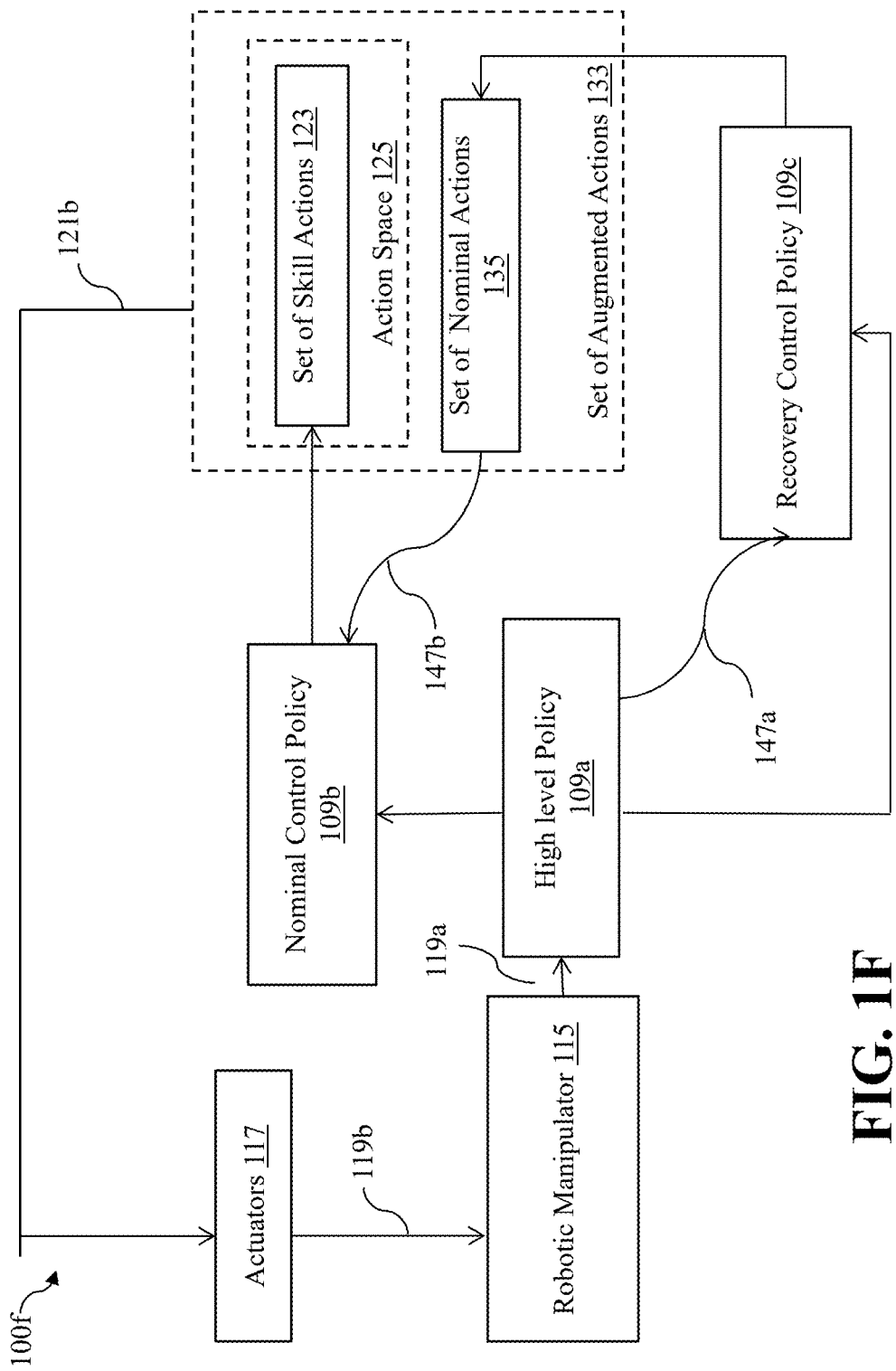
FIG. 1F illustrates a schematic of switching of the control policies, in accordance with one or more example embodiments.

FIG. 1F illustrates a schematic 100f of switching of the control policies, in accordance with one or more example embodiments. As shown in FIG. 1F, the high level policy 109a is further configured to switch 147a the execution of the nominal control policy 109b to the execution of the recovery control policy 109c in response to the measurements 119a indicate that the robotic manipulator 115 is within the fault state region. Further, the high level policy 109a is further configured to switch 147b the execution of the recovery control policy 109c to the execution of the nominal control policy 109b in response to the recovery control policy 109c generating the switch-to-nominal action.

In some embodiments, the processor 103 is further configured to iteratively execute the HRL neural network 107 to generate the action from the at least one of: the nominal action 127 and the recovery action 137. Further, the processor 103 is further configured to cause the control the robotic manipulator 115 to perform the task based on the generated action. Accordingly a schematic is provided with reference to FIG. 1G.

Figure 1G:
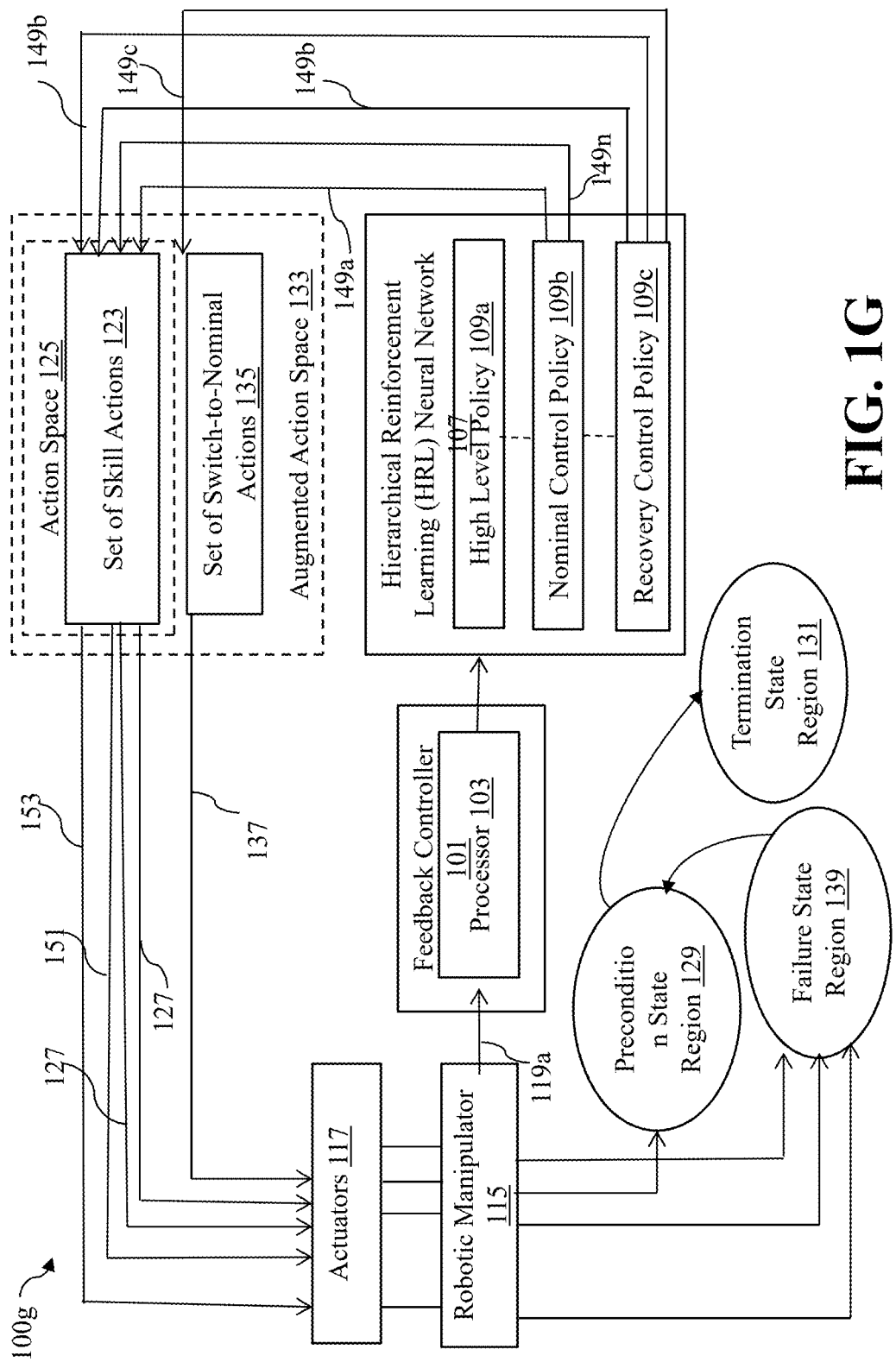
FIG. 1G illustrates a schematic of the feedback controller for controlling the robotic manipulator, in accordance with one or more example embodiments.

FIG. 1G illustrates a schematic 100g of the feedback controller 101 for controlling the robotic manipulator 115, in accordance with one or more example embodiments. As shown in FIG. 1G, the high level policy 109a is further configured to iteratively execute at least one of: the nominal control policy 109b or the recovery control policy 109c to perform the task.

For a first iteration 149a, the high level policy 109a is further configured to select the nominal control policy 109b in response the nominal control policy 109b generating the nominal action 127 that transitions the robotic manipulator 115 in the termination state region 131.

For a second iteration 149b, the high level policy 109a is further configured to switch the execution of the nominal control policy 109b to the execution of the recovery control policy 109c in response to the measurements indicate that the robotic manipulator 115 is within the failure state region 139. Further, the recovery control policy 109c is further configured to map at least a first portion of the measurements to a generated recovery action 151 selected from the augmented action space 133 of the robotic manipulator 115. Further, the generated recovery action 151 is different from the switch-to-nominal action.

For a third iteration 149c, the high level policy 109a is further configured to select the recovery control policy 109c in response to the generated recovery action 149 is different from the switch-to-nominal action. Further, the recovery control policy 109c is further configured to map at least a second portion of the measurements to a generated recovery action 153 selected from the augmented action space 133 of the robotic manipulator 115. Further, the generated recovery action 153 is different from the switch-to nominal action.

For a fourth iteration 149d, the high level policy 109a is further configured to select the recovery control policy 109d in response to the generated recovery action 151 is different from the switch-to nominal action. Further, the recovery control policy 109c is further configured to map at least a third portion of the measurements to the generated recovery action 127. Further, the generated recovery action 127 is the switch-to-nominal action.

Likewise nth iteration 149n, the high level policy 109a is further configured to switch the execution of the recovery control policy 109c to the execution of the nominal control policy 109b and select the nominal control policy 109b in response to the recovery control policy 109c generating the switch-to-nominal action transferring control to the nominal control policy 109b. Further, the nominal control policy 109b is further configured to map the measurements to the nominal action transition the robotic manipulator 115 in the precondition state region 129 to the termination state region 131.

Accordingly a method for controlling the robotic manipulator 115 is described with reference to FIG. 2.

Figure 2:
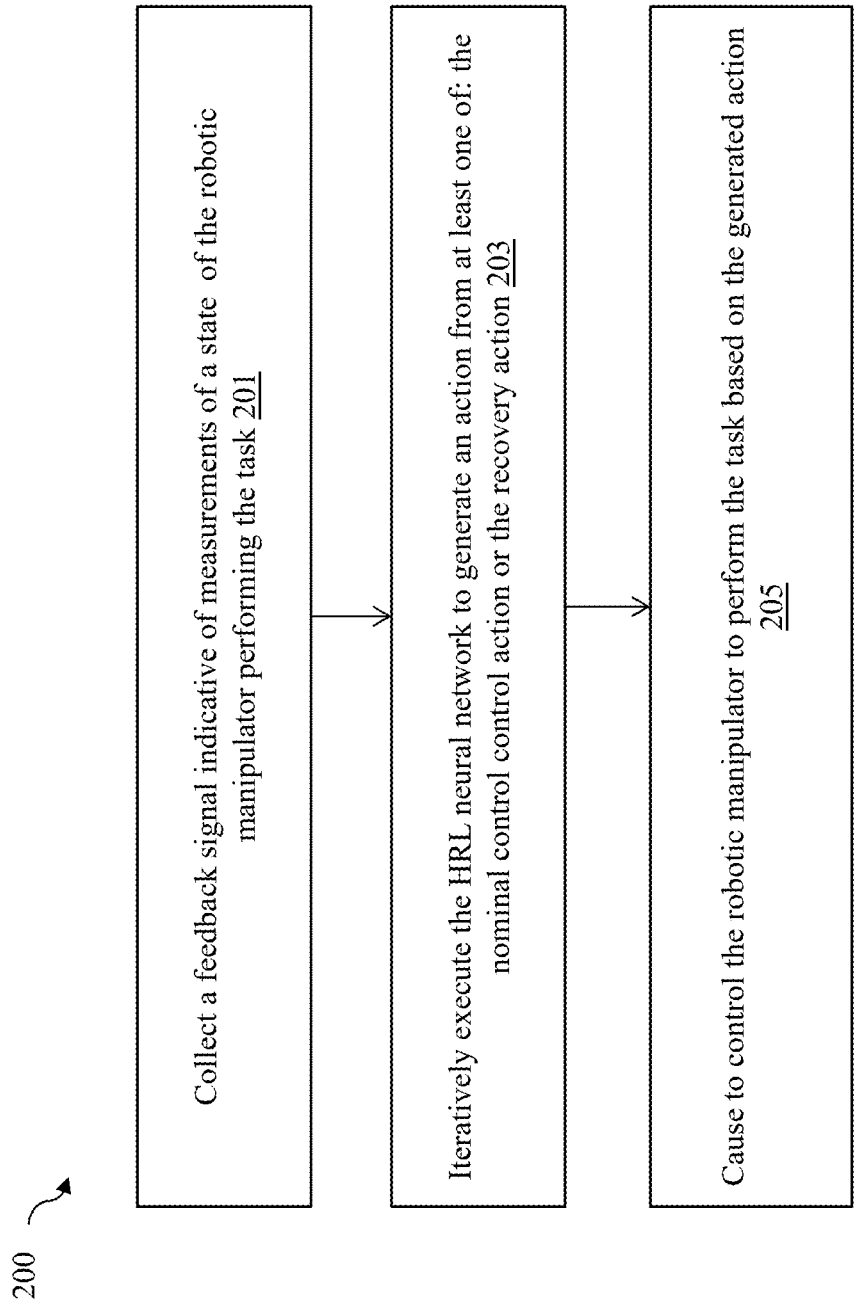
FIG. 2 illustrates a flowchart of a method for controlling the robotic manipulator, in accordance with one or more example embodiments.

FIG. 2 illustrates a flowchart of a method 200 for controlling the robotic manipulator 115, in accordance with an example embodiment. In one or more embodiments, the feedback controller 101 may perform one or more portions of the method 200 and may be implemented in, for instance, the processor 103. As such, the feedback controller 101 may provide means for accomplishing embodiments of other process described herein in conjunction with other components of the feedback controller 101. Although the method 200 is illustrated as a sequence of steps, its contemplated that various embodiments of the method 200 may be performed in any order or combination and need not include all of the illustrated steps.

At block 201, the feedback signal 119a indicative of measurements of the state of the robotic manipulator 115 performing the task is collected. In an example embodiment, the user interface 111 is configured to collect the feedback signal 119a indicative of measurements of the state of the robotic manipulator 115 performing the task.

At 203, the HRL neural network 107 is iteratively executed to generate an action from at least one of: the nominal action or the recovery action.

At 205, the robotic manipulator is controlled to perform the task based on the generated action.

Some embodiments are based on realization the switch actions can be performed based on a precondition learning approach. The precondition learning approach allows the processor 103 to cause the feedback controller 101 to perform the second switch action to switch the execution of the recovery control policy 109c to the execution of the nominal control policy 109b based on preconditions of the nominal control policies of the set of nominal control policies 109a. In some embodiments, the preconditions of the nominal control polices correspond to a nominal policy initiation set. Accordingly, a schematic of principles is provided with reference to FIG. 3.

Figure 3:
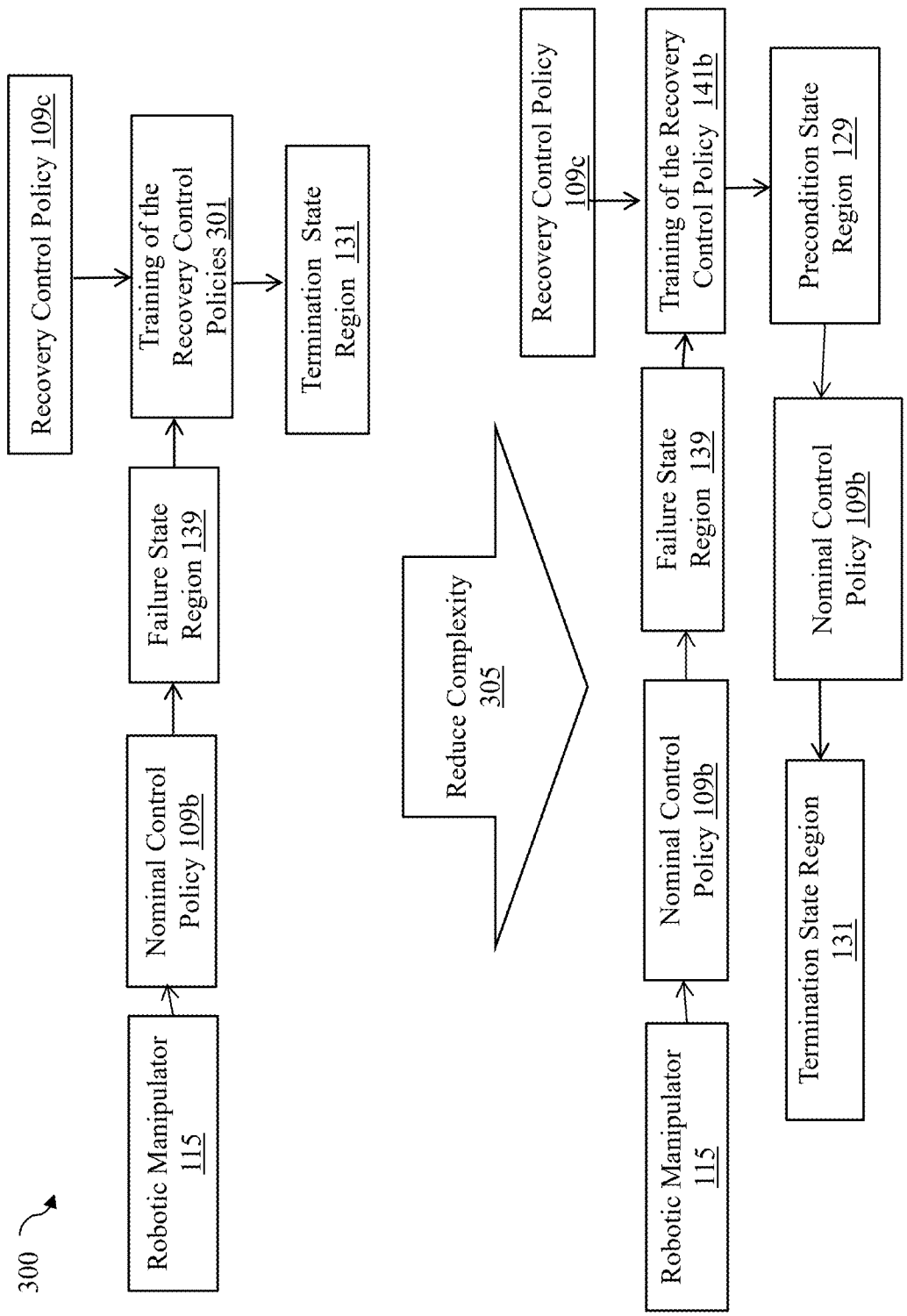
FIG. 3 illustrates a schematic of principles used by some embodiments for controlling the robotic manipulator, in accordance with one or more example embodiments.

FIG. 3 illustrates a schematic 300 of principles used by some embodiments for controlling the robotic manipulator 115, in accordance with one or more example embodiments. As shown by FIG. 3, some embodiments are based on an objective to switch the execution of the nominal control policy 109b to the execution of the recovery control policy 109c in response to the robotic manipulator 115 within the failure state region 139. Some embodiments are based on an understanding that the recovery control policy 109c may be trained 301 to transition the robotic manipulator 115 in the failure state region 139 to the termination state region 131. However, as the robotic manipulator 115 may be transitioned in the failure state region 139 at any point in a long time horizon of the task including at the starting of the task, the training of the recovery policy 307 may be computationally expensive.

Hence, some embodiment are based on realization to use the precondition learning approach to reduce 305 a complexity associated with the training 301 of the recovery policy 109c. Some embodiments are based on realization that the recovery control policy 109c may be trained to implicitly learn the precondition state region 129 by iteratively executing the recovery control policy 109c to transition in the precondition state region 129 from the failure state region 139 and transfer control to the nominal control policy 109b. Further, the nominal control policy 109b is executed to transition from the precondition state region 129 to the termination state region 131.

In some embodiments, the processor 103 is further configured to determine failure states associated with the failure state region 139 based on a value function. Accordingly, a schematic is provided with reference to FIG. 4A.

Figure 4A:
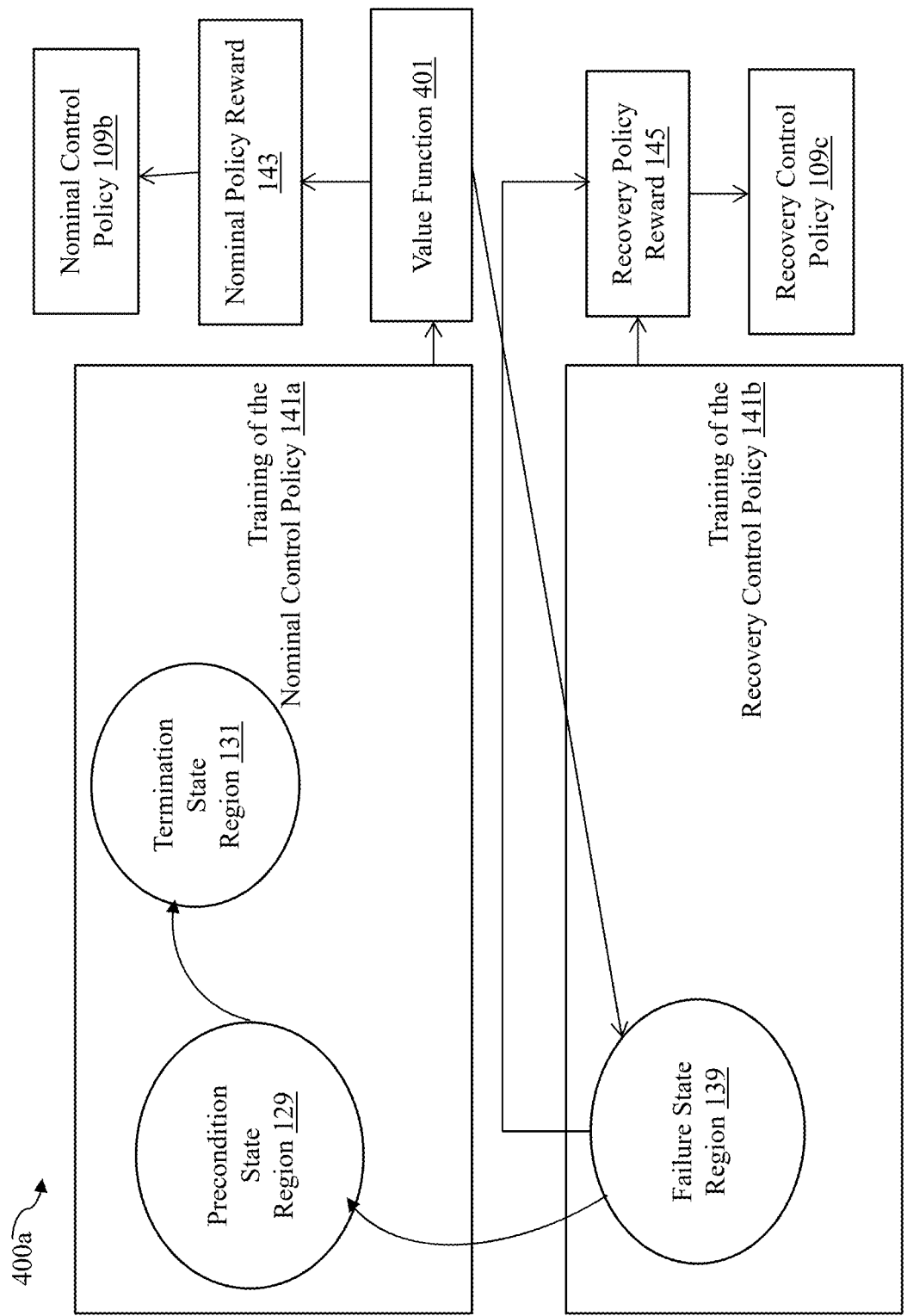
FIG. 4A illustrates a schematic of a value function used by some embodiments for controlling the robotic manipulator, in accordance with one or more example embodiments.

FIG. 4A illustrates a schematic 400a of a value function 401 used by some embodiments for controlling the robotic manipulator 115, in accordance with one or more example embodiments. As shown in FIG. 4A, the processor 103 is further configured to determine, based on the value function 401 corresponding to the nominal control policy 109, failure states associated with the failure state region 139 during training of the HRL neural network 107. Further, the processor 103 is further configured to determine, based on the value function 401 corresponding to the nominal control policy 109b, the nominal policy reward 143.

In some embodiments, a state space of the robotic manipulator 115 includes a plurality of failure state regions. Accordingly, a schematic is provided with reference to FIG. 4B.

Figure 4B:
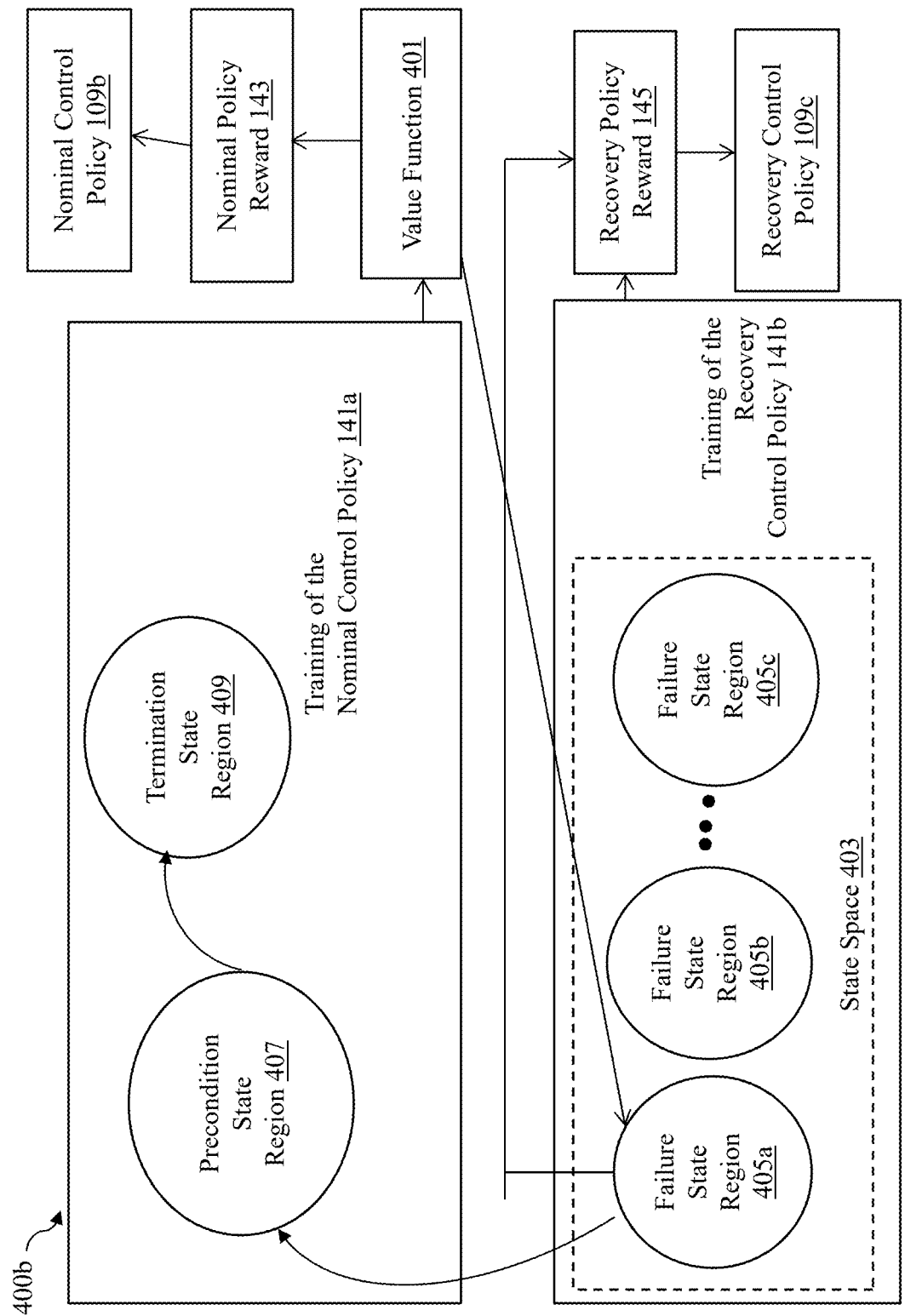
FIG. 4B illustrates a schematic of a state space of the robotic manipulator, in accordance with one or more example embodiments.

FIG. 4B illustrates a schematic 400b of a state space 403 of the robotic manipulator 115, in accordance with one or more example embodiments. As shown in FIG. 4B, the state space 403 of the robotic manipulator 115 includes the plurality of failure state regions, for example, a failure state region 405a, a failure state region 405b, and a failure state region 405c.

In some embodiments, the HRL neural network 107 includes a plurality of control policies, for example, a plurality of high level policy, a plurality of nominal control policies and a plurality of recovery control policies. Accordingly a block diagram is provided with reference to FIG. 4C.

Figure 4C:
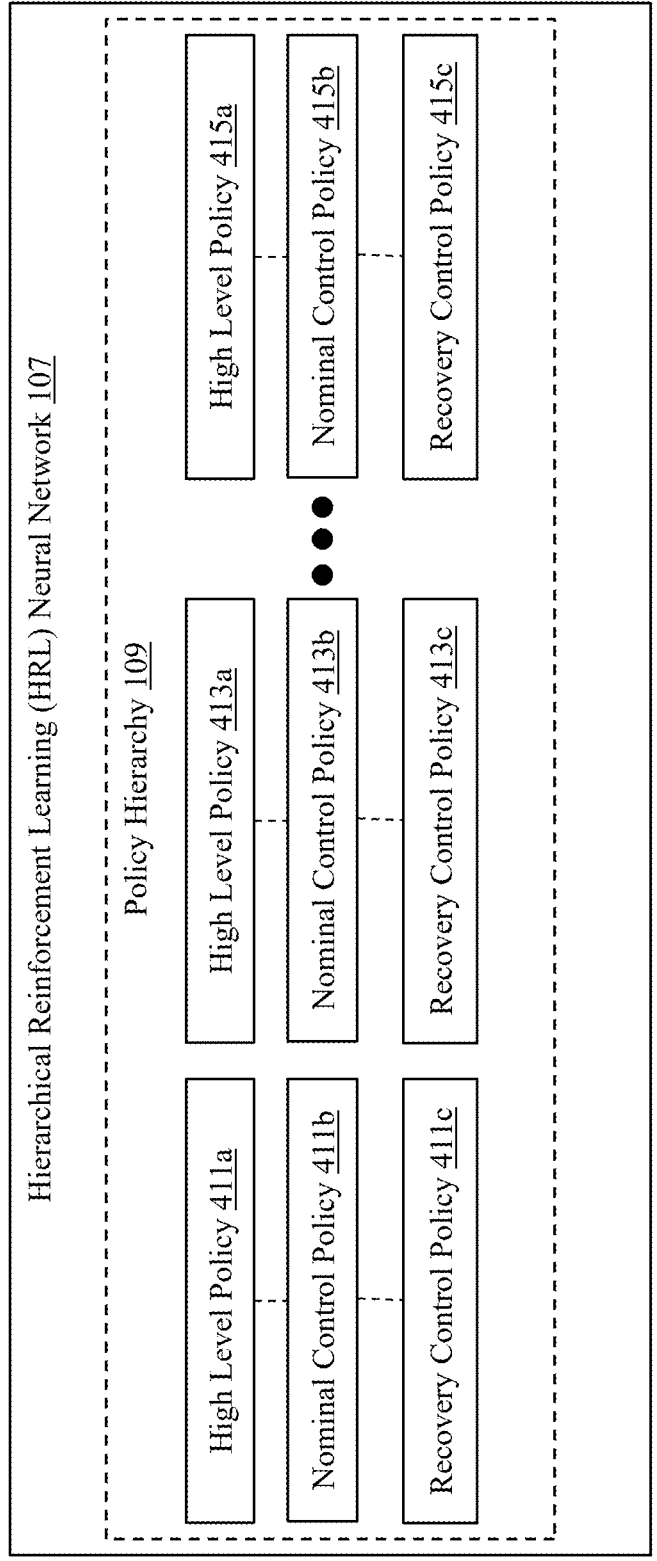
FIG. 4C illustrates a block diagram of hierarchical reinforcement learning (HRL) neural network, in accordance with one or more example embodiments.

FIG. 4C illustrates a block diagram 400c of the HRL neural network 107, in accordance with one or more example embodiments. As shown in FIG. 4C, the HRL neural network 107 includes the policy hierarchy 109. Further, the policy hierarchy 109 further includes the plurality of high level policies, the plurality of nominal control policies, and the plurality of recovery control policies. The plurality of high level policies includes a high level policy 411a, a high level policy 413a, and a high level policy 415a. The plurality of nominal control policies includes a nominal control policy 411b, a nominal control policy 413b, and a nominal control policy 415b. The plurality of recovery control policies includes a recovery control policy 411c, a recovery control policy 413b, and a recovery control policy 415c.

In some embodiments, the processor 103 is configured to train a respective recovery control policy for a precondition state region of the plurality of preconditions state regions. Accordingly, a schematic is described with reference to FIG. 4D.

Figure 4D:
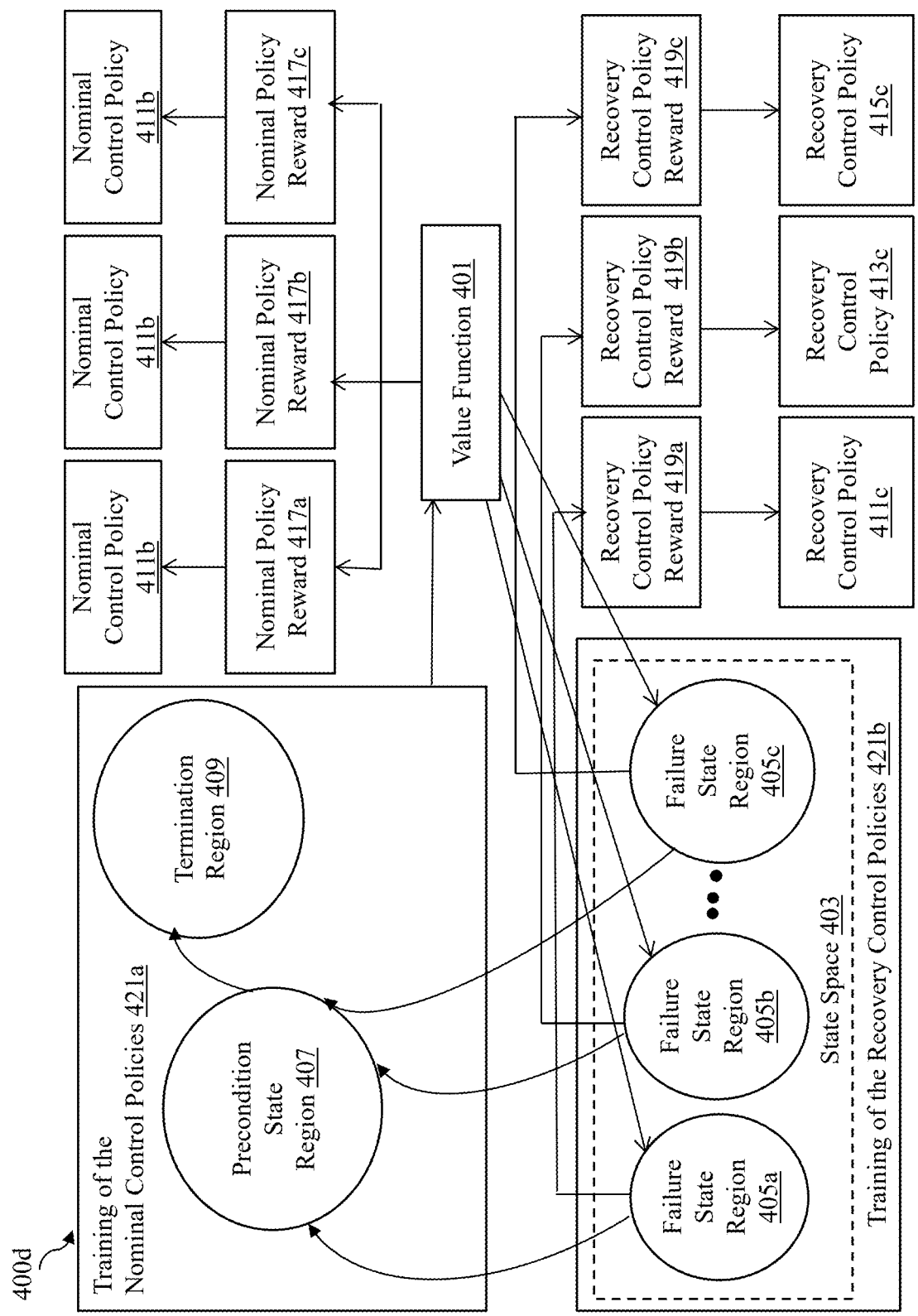
FIG. 4D illustrates a schematic that illustrates another embodiment of a training of control policies, in accordance with one or more example embodiments.

FIG. 4D illustrates a schematic 400d that illustrates another embodiment of a training of control policies, in accordance with one or more example embodiments. As shown in FIG. 4D, the training 421a of the plurality of nominal control policies includes transitioning of the robotic manipulator 115 in the precondition state region 407 to the termination state region 409.

Further, the recovery control policy 411c is trained for the failure state region 405a. The recovery control policy 413c is trained for the failure state region 405*b*. The recovery control policy 415*c* is trained for the failure state region 405*c*.

In an example embodiment, the processor 103 is further configured to generate a nominal policy reward 417*a* corresponding to the transitioning of the robotic manipulator 115 in the precondition state region 407 to the termination state region 409 based on the value function 401. Further, based on the nominal policy reward 417*a*, the processor 103 is further configured to train the recovery control policy 411*c* for the failure state region 405*a*. Further, the trained recovery control policy 411*c* is configured to transition the robotic manipulator 115 in the failure state region 405*a* to the precondition state region 407 of the nominal control policy 411*b*.

In another example embodiment, the processor 103 is further configured to generate a nominal policy reward 417*b* corresponding to the transitioning of the robotic manipulator 115 in the precondition state region 407 to the termination state region 409 based on the value function 401. Further, based on the nominal policy reward 417*b*, the processor 103 is further configured to train the recovery control policy 413*c* for the failure state region 405*b*. Further, the trained recovery control policy 413*c* is configured to transition the robotic manipulator 115 in the failure state region 405*b* to the precondition state region 407 of the nominal control policy 411*b*.

In yet another example embodiment, the processor 103 is further configured to generate a nominal policy reward 417*c* corresponding to the transitioning of the robotic manipulator 115 in the precondition state region 407 to the termination state region 409 based on the value function 401. Further, based on the nominal policy reward 417*c*, the processor 103 is further configured to train the recovery control policy 415*c* for the failure state region 405*c*. Further, the trained recovery control policy 413*c* is configured to transition the robotic manipulator 115 in the failure state region 405*c* to the precondition state region 407 of the nominal control policy 411*b*.

Figure 5A:
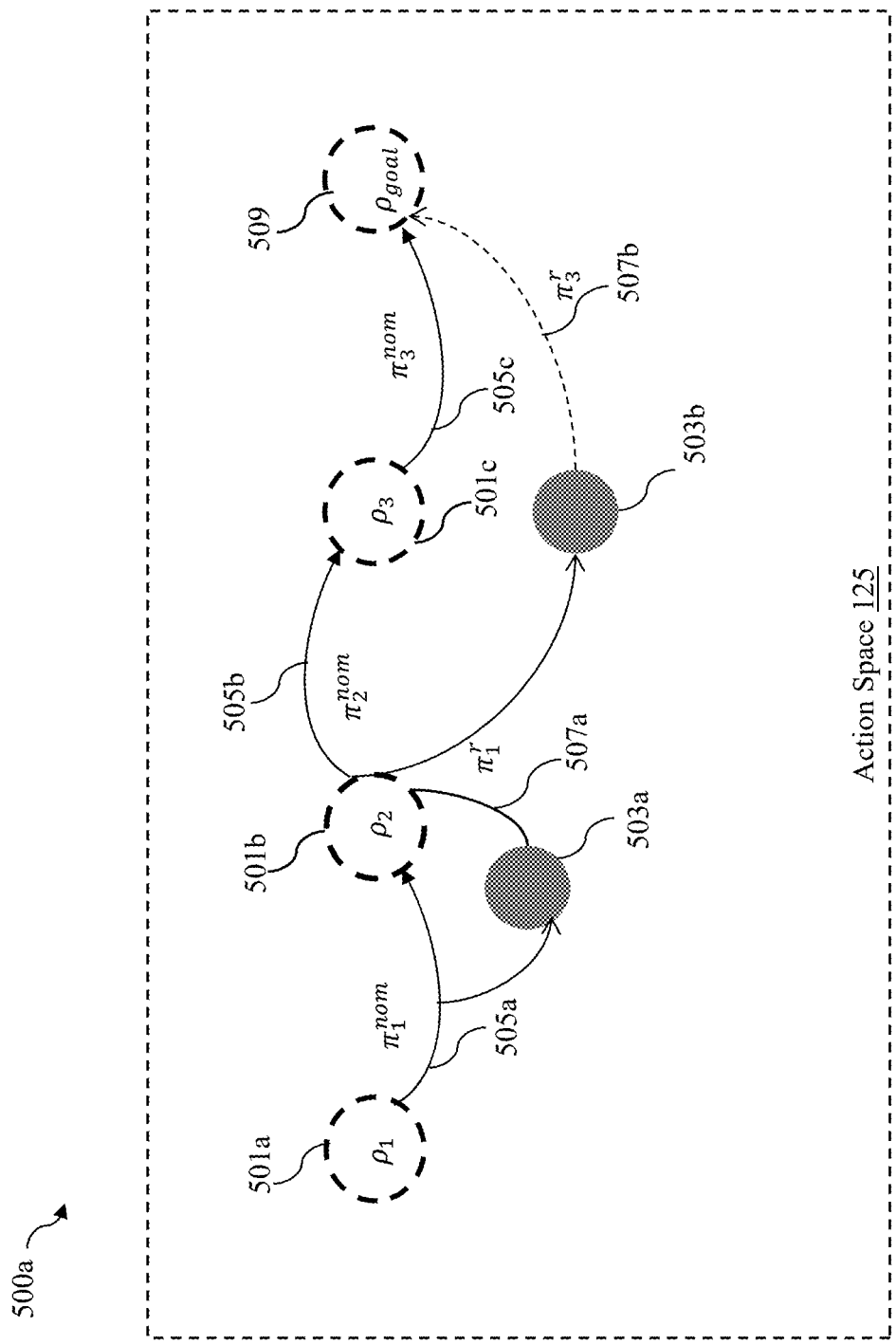
FIG. 5A illustrates a schematic for training of the plurality recovery control policies in an action space, in accordance with one or more example embodiments.

FIG. 5A illustrates a schematic 500*a* for training of the plurality recovery control policies in an action space 125, in accordance with an example embodiment. The schematic 500*a* include the plurality of nominal control polices, the plurality of recovery control policies, the plurality of precondition state regions, a plurality of failure stare region, and a termination state region 509. The precondition state regions are the regions in the state space of the nominal (or recovery) policies from where they have been trained to be successful. So, the precondition state regions is where the nominal policies are initialized. The plurality of precondition state regions includes a precondition state region 501*a* denoted by $\rho_1$, a precondition state region 501*b* denoted by $\rho_2$, and a precondition state region 501*c* denoted by $\rho_3$. The plurality of failure state regions includes a failure state region 503*a*, and a failure state region 503*b*. The plurality of nominal control polices includes a nominal control policy 505*a*, a nominal control policy 505*b*, and a nominal control policy 505*b*.

In an example embodiment, the nominal control policy 505*a* is configured to transition the robotic manipulator 115 in the precondition state region 501*a* of the nominal control policy 505*a* to the precondition state region 501*b* of the nominal control policy 505*b*. However, due to the failures, the robotic manipulator 115 is transitioned to the failure state region 503*a*. Further, the recovery control policy is configured to transition the robotic manipulator 115 from the failure state region 503*a* to the precondition state region 501*b* of the nominal control policy 507*b*.

In another example embodiment, due to failures, the robotic manipulator 115 is transitioned to the failure state region 503*b*. Further, the recovery control policy 507*b* is configured to transition the robotic manipulator 115 from the failure state region 503*b* to the termination state region 509.

Some embodiments are based on a realization that the failures may occur at any point in the long time horizon associated with the task and to train the plurality of recovery control policies to transition from the failure state region to the termination state region 509 is computationally expensive. Hence, some embodiments are based on an objective to train the control polices in the augmented action space to perform the one or more tasks. Accordingly, a schematic is provided with reference to FIG. 5B.

Figure 5B:
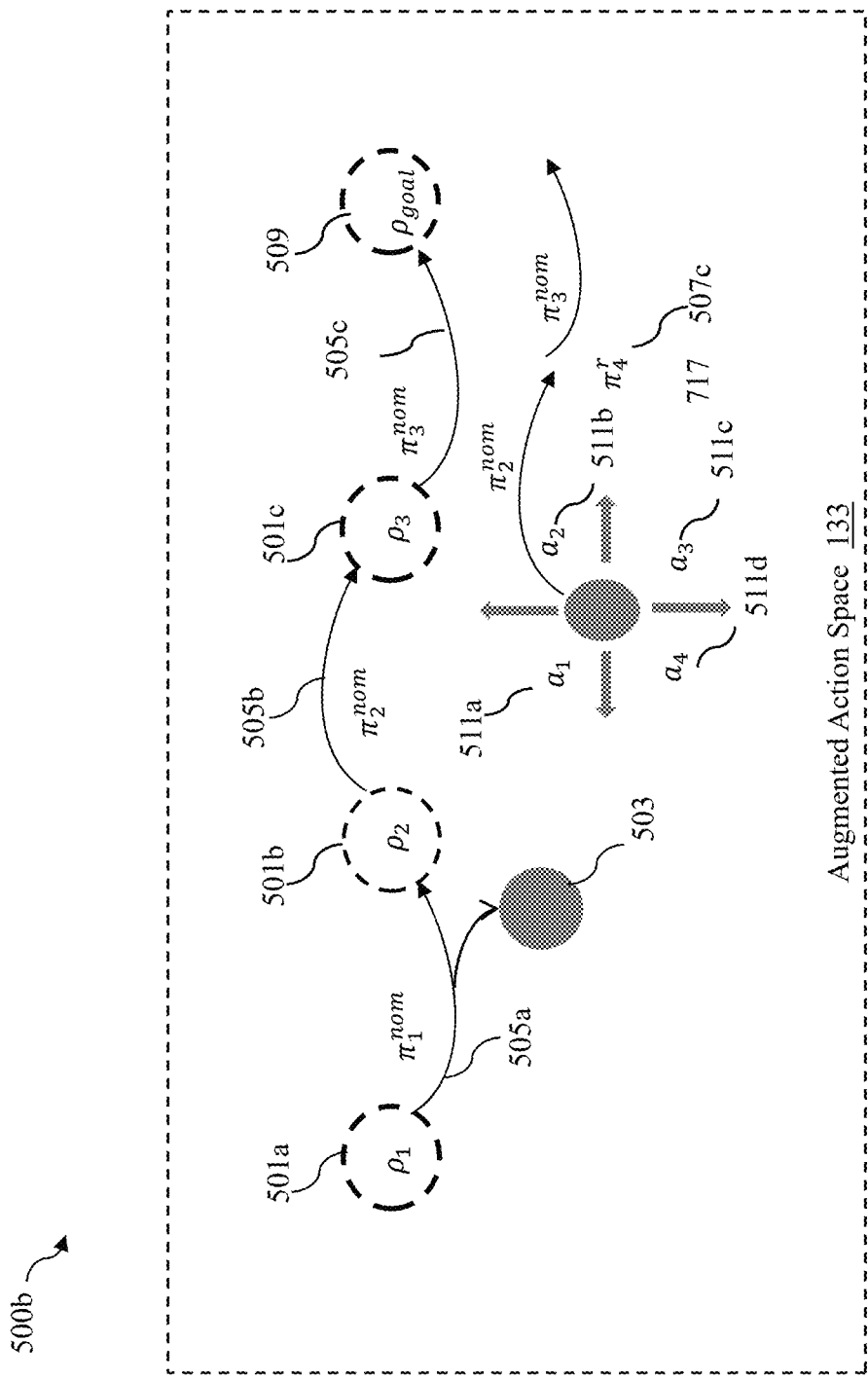
FIG. 5B illustrates a schematic for training of the plurality recovery control policies in an augmented action space, in accordance with one or more example embodiments.

FIG. 5B illustrates a schematic 500*b* for training of the plurality recovery control policies in an augmented action space 133, in accordance with an example embodiment. As shown by FIG. 5B, a recovery control policy 507*c* is configured to iteratively generate the recovery action selected from the augmented action space 133. Further, the augmented action space 133 includes a skill action 511*a*, a switch-to-nominal action 511*b*, a skill action 511*c*, and a skill action 511*d*. Further, the recovery control policy 507*c* is further configured to transfer the control to the nominal control policy 505*b* to complete the task. Further, the processor 301 is further configured to determine the recovery policy reward based on a determination that the robotic manipulator 115 is within the termination state region 509 after transfer the control to the nominal control policy 505*b*.

Figure 6A:
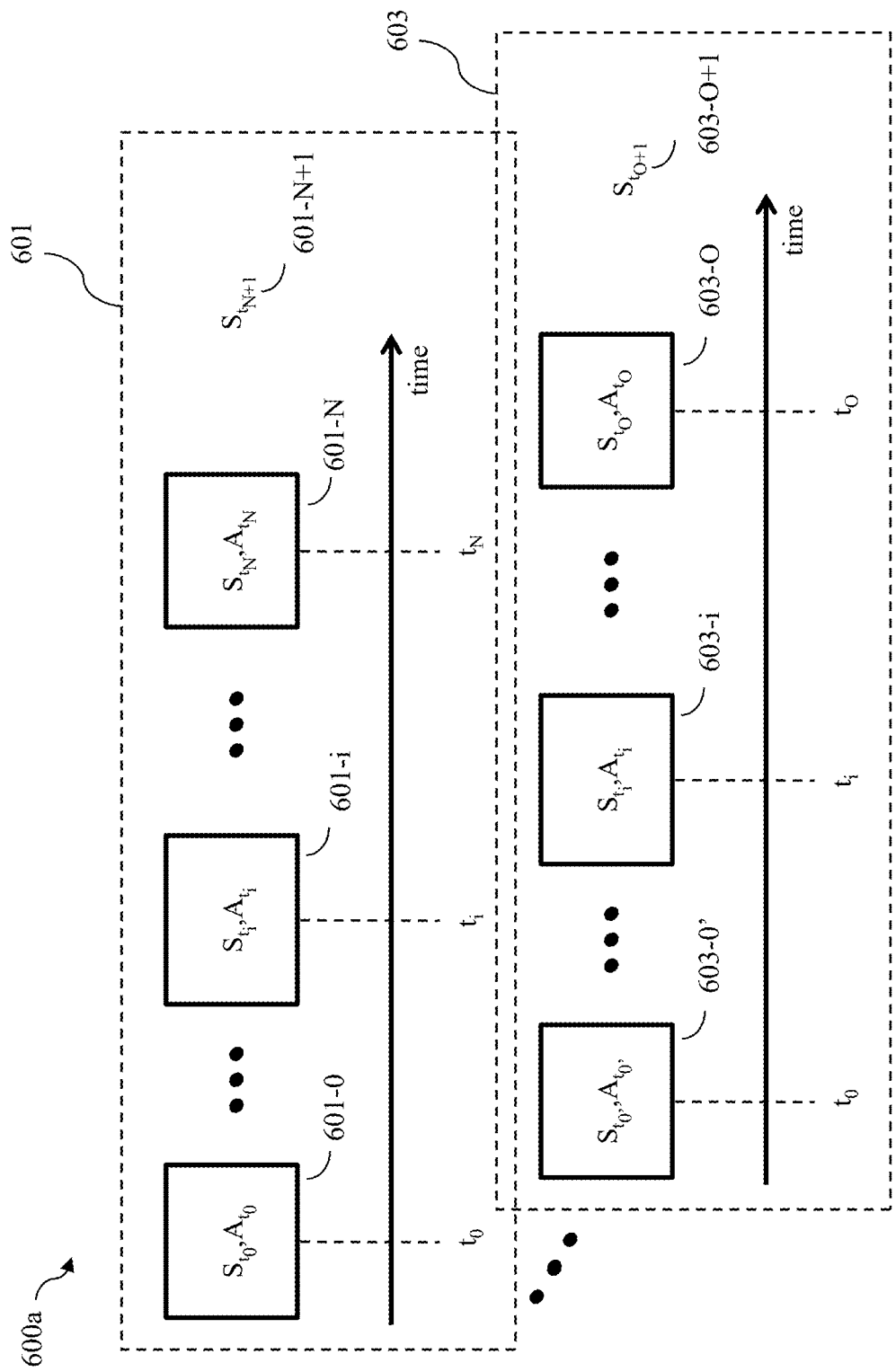
FIG. 6A illustrates exemplary tasks performed by controlling the robotic manipulator, according to some embodiments.

FIG. 6A illustrates exemplary tasks 600*a* performed by controlling the robotic manipulator 115, according to some embodiments. The exemplary tasks 600*a* include an exemplary task 601 and an exemplary task 603.

It is objective of some embodiments to store the set of executions of the exemplary task 601 received from the one or more control commands 119*b*. Some embodiments are based on recognition that the exemplary task 601 is defined by state/action pairs, while control policies, for example, the plurality of nominal control polices 505, and the plurality of recovery control polices 507 are unknown or undefined. The robotic manipulator 115 is configured to perform, based on the state/action pairs, the exemplary task 601 in the augmented action space 133. Further, the control policies chain a sequence of the state/action pairs in the augmented action space 133.

In some embodiments, the exemplary task 601 is stored in the memory 105 of the feedback controller 101 as the sequences of state/action pairs. In some embodiments, the sequences of state/action pairs are defined in the augmented action space 133. For instance, the exemplary task 601 is defined as the sequence of state/action pairs from a start time to an end time.

Further, a state $S_t$ at a particular time t includes values that define current settings of the robotic manipulator 115. Further, in some embodiments, the values are augmented corresponding to the augmented action space 133. In some embodiments, the settings of the robot manipulator 115 include, but are not limited to, settings of the one or more actuators 117, settings of the plurality of joints, settings of the end effector, tools, locations, images or any combination thereof.

In an example embodiment, the values correspond to a joint value for a particular robotic manipulator configuration. Examples of the values in the augmented action space 133 include location of the one or more objects, for example, the object, a location of one or more obstacles, a distance to a goal location, an image of the augmented action space 133.

Further, an action at the particular time t comprises a vector of values to determine different settings of the robotic manipulator 115. Some embodiments are based on realization that the action changes the state of the robotic manipulator 115. The action may correspond to a single value, a vector of values or the like.

Further, the exemplary task 603 may correspond to a last exemplary task. Further, in some embodiment, the exemplary task 601 starts at time t0 and stores the state and action 601-0 (for instance, the state/action pair—$S_{t_0}, A_{t_0}$) at the time t0.

In some embodiments, the action (i.e. $A_{t_0}$) to be taken for the state (i.e. $S_{t_0}$) is defined as the control step for the time to. The memory 105 of the feedback controller 101 is further configured to store the exemplary task 601 up-to the exemplary task 601 end time. At the end time $t_N$, the memory 105 of the feedback controller 101 is further configured to store the state and action 601-N (for instance, the state/action pair—$S_{t_N}, A_{t_N}$). Therefore, the exemplary task 601 comprises N+1 state/action pairs for N+1 time instances.

Once, at time $t_N$, the final action $A_{t_N}$ is demonstrated for the exemplary task 601, the robotic manipulator 115 ends up in state $S_{t_{N+1}}$. Accordingly, the state 601-N+1 is stored in the memory 105 of the robotic manipulator. According to some embodiments, the stored exemplary task 601 may be represented as a trajectory $\xi=(S_{t_0}, A_{t_0}, S_{t_1}, A_{t_1}, \ldots, S_{t_{N+1}})$.

Further, the memory 105 is further configured to store all the finite number of exemplary tasks as explained in reference to the exemplary task 601.

According to some embodiments, the exemplary tasks 600a in the memory 105 may have same or different sequences of state/action pairs. For instance, the state/action pairs 603-0 to 603-O may be same or different to the state/action pairs 603-0' to 603-N.

In addition, the first state and action pair for exemplary tasks may be same or different. In addition, the exemplary tasks 600a may have same or different lengths. For instance, the exemplary task 603 may comprise O+1 state/action pairs for O+1 time instances and the exemplary task 603 may comprise N+1 state/action pairs for N+1 time instances.

Some embodiments are based on an objective to train the control polices for switching between the execution of the plurality of nominal control policies and the execution of the plurality of recovery control policies. According, a schematic of a training module is described with reference to FIG. 6B.

Figure 6B:
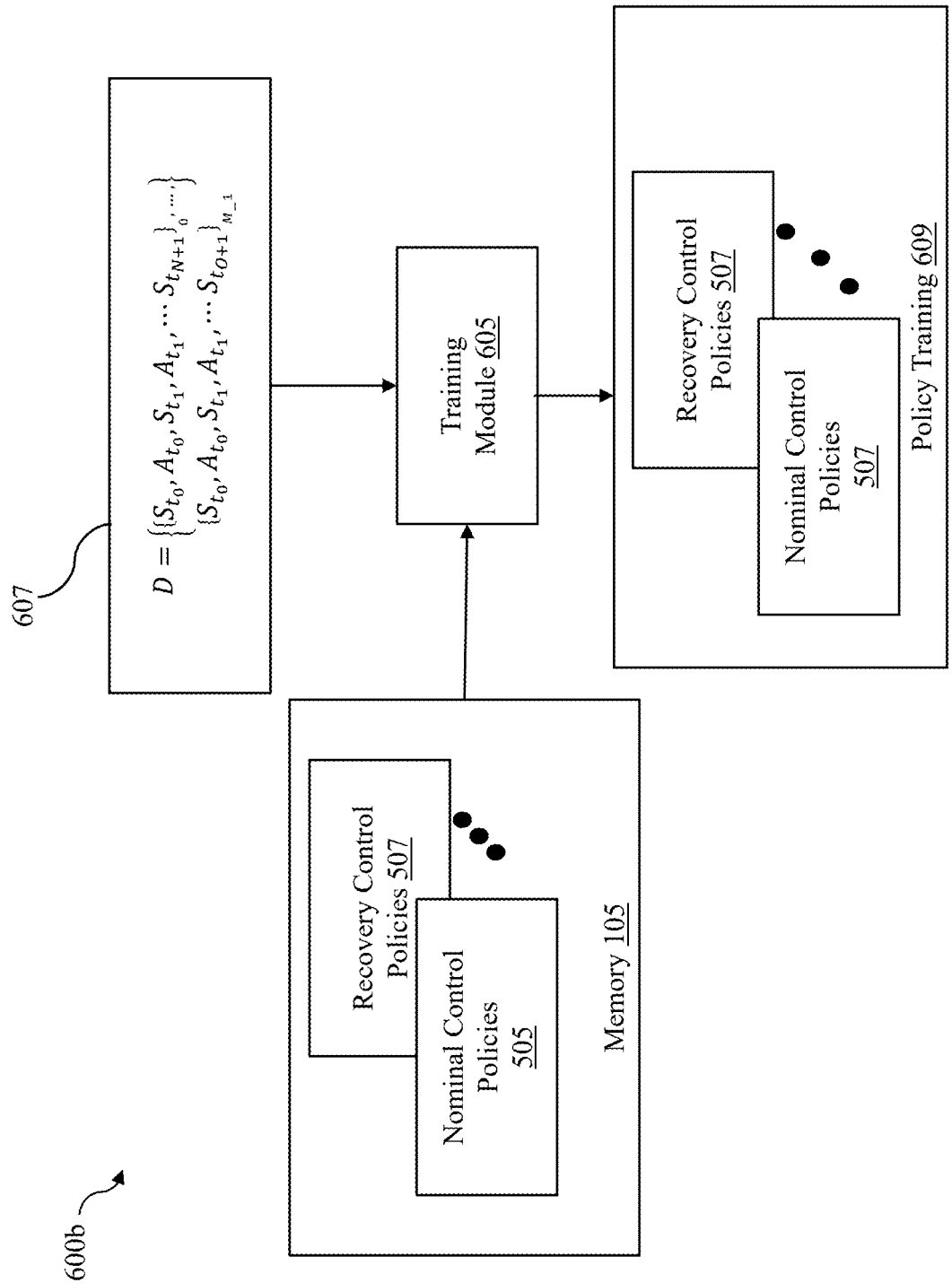
FIG. 6B illustrates a schematic for implementation of a training module to train the plurality nominal control policies and the plurality recovery control polices for controlling the robotic manipulator, in accordance with one or more example embodiments.

FIG. 6B illustrates a schematic 600b for implementation of a training module 605 to train the plurality of nominal control policies 505 and the plurality recovery control polices 507, in accordance with one or more example embodiments. Further, the training module 605 is configured to train the plurality of nominal control policies 505 and the plurality recovery control policies 507 for controlling the robotic manipulator 115.

In some embodiments, the training module 605 is further configured to train the plurality of nominal control policies 507 and the plurality of recovery control policies for selecting the skill action of the set of skill actions 123 based on the exemplary tasks 600a. In some embodiments, the training module 605 is further configured to train the plurality of recovery control policies 507 for generating the switch-to-nominal action of the set of nominal actions 135.

Further, in some embodiments, the training of the function may be contemplated as the training of the one or more controllers. In some embodiments, the skill actions in the set of skill actions 123 are task agnostic to perform the task.

Some embodiments are based on an objective to train the plurality of nominal control polices 505 to map the measurement to the skill action of the set of skill actions 123. Some embodiments are further based on an objective to train the plurality of recovery control policies 507 to map the measurements to the recovery action selected from the augmented action space Some embodiments are based on realization that the training module 605 is further configured to receive the set of executions of the exemplary tasks 600b task. In some embodiments, the training module 605 is further configured to receive the set of executions of the exemplary tasks 600a from the memory 105.

The exemplary tasks 600a are defined as the sequences of state/action pairs as exemplarily illustrated in FIG. 6A. The exemplary tasks 600a are performed by the robotic manipulator 115 in runtime. In some embodiments, the training module 605 is further configured to receive M finite exemplary tasks, where M>=1. According to some embodiments, the M finite exemplary tasks are defined as a set of trajectories D 607 i.e. D=$\{\xi_0, \xi_1, \ldots, \xi_{M-1}\}$.

which is equivalent to $$D = \left\{ \begin{array}{c} \{S_{t_0}, A_{t_0}, S_{t_1}, A_{t_1}, \ldots S_{t_{N+1}}\}_0, \{S_{t_0}, A_{t_0}, S_{t_1}, A_{t_1}, \ldots S_{t_{K+1}}\}_1, \ldots, \\ \{S_{t_0}, A_{t_0}, S_{t_1}, A_{t_1}, \ldots S_{t_{O+1}}\}_{M-1} \end{array} \right\}$$

Further, the trained module 605 is further configured to perform a policy training 609 corresponding to the plurality of nominal control policies 507. In the policy training 609, the trained module 605 is further configured to train each policy of the plurality of nominal control policies 505 to generate, based on the feedback signal 119a, a nominal action transitioning the robotic manipulator 115 in the precondition state region 129 to the termination state region 131 of the task. Further, the trained module 605 is further configured to generate, based on at least the portion of the feedback signal 119a, the recovery action transitioning the robotic manipulator 115 in the failure state region 139 to the precondition state region 129 of the nominal control policy 109b.

In some embodiments, the training module 605 is further configured to employ one or more HRI algorithms to train each recovery control policy of the plurality of recovery control policies 507.

Accordingly, a policy learning algorithm is described with reference to FIG. 7A.

FIG. 7A is a policy learning algorithm 700a for determining the plurality of recovery control policies 109b, in accordance with one or more example embodiments. At 701, the processor 103 is further configured to execute a policy learning function denoted as LearnRecovery($\xi$) configured to determine a set of recovery control polices based on the trajectory $\xi$.

Further, at 703, the processor 103 is further configured to execute each nominal policy of a set of nominal control policies to determine a set of failures. Further, the set of failures includes at least one of: a collision failure, a high contact force failure, and a slip failure. Further, the processor 103 is further configured to perform clustering operation on the set of failures to determine a set of failure clusters denoted as cluster $D_{fail}$.

Further, at 705, the processor 103 is further configured to execute the value function 401 corresponding to each nominal control policy of the set of nominal control policies. The value function 401 indicates a success chance of achieving a desired state, for example the termination state region 131.

Further, at 707, the processor 103 is further configured to initialize an empty set of recovery control policies.

Further, at 709, for each failure cluster, the processor 103 is further configured to execute a skill learning function iteratively to determine a trained recovery control policy and a corresponding recovery control policy initiation set. Further, the processor 103 is further configured to iteratively add the trained recovery control policy and the corresponding recovery control policy initiation set to the empty set of recovery control policies to determine the set of recovery control policies.

Further, some embodiments are based on an objective to employ a skill learning algorithm for training the recovery control policies of the set of recovery control policies. Accordingly, the skill learning algorithm is described with reference to FIG. 7B.

FIG. 7B is a skill learning algorithm 700b for training the recovery control policies of the set of recovery control policies, in accordance with one or more example embodiments.

At 711, the processor 103 is further configured to execute the skill learning function denoted as LearnRobustSkill ($D_{fail}$) configured to determine the train recovery control policy and the corresponding recovery control policy initiation set corresponding to each failure cluster of the set of failure clusters $D_{fail}$.

At 713, the processor 103 is further configured to determine a set of augmented actions 133 by adding the set of switch-to-nominal actions 135 to the set of skill actions 123 defining the action space 125.

At 715, the processor 103 is further configured to define a reward function r(s, a, s') based on a binary goal function, for example, the goal function denoted as $f_{goal}$, a state value function denoted as $V^{nom}(s)$, and an action value function denoted as $V_{nom(s')}$. In some embodiments, the processor 103 is further configured to determine, using the reward function, a reward value corresponding to achieving the goal state. The processor 103 is further configured to minimize, based on the reward value, a deviation associated with the achieving the goal state. In some embodiments, a value associated with the action value function is decreased to determine a negative reward value.

At 717, the processor 103 is further configured to configured to train, using a mixed observable Markov decision process (MOMDP) associated with simulated full state data of the augmented action space, a corresponding recovery policy for each failure cluster of the set of failure clusters. The MOMDP is defined as:

$$\mathcal{M} := (\mathcal{S}, \mathcal{A}_{aug}, r, T, \gamma, \mathcal{D}_{fail}),$$

wherein, $\mathcal{S}$ is a state space of the robotic manipulator 115, $\mathcal{A}_{aug}$ is the augmented action space 133, r is the reward function, T is a transition function, $\gamma$, and $\mathcal{D}_{fail}$ is the set of failure clusters. In some embodiments, the set of failure clusters may correspond to an initial state distribution.

In some embodiments, the feedback controller 101 is defined as the MOMDP, wherein the robot manipulator 115 maintains an estimate $\hat{s} := (x, \hat{y})$ of a true state s and acts based on ($\hat{s}$, o). Further, o∈O corresponds to sensory observations such as images and proprioception.

At 719, the processor 103 is further configured to determine the recovery policy initiation set corresponding to each failure cluster of the set of failure clusters. In some embodiments, the processor 103 is further configured to determine the recovery policy initiation set based on a comparison between an output of a function and a threshold. Specifically, the processor 103 is further configured to determine the recovery policy initiation set based on a determination that the output of the function is greater than the threshold. Further, the output of the function and threshold may correspond to at least one of: a numeric value, and a vector of values.

Some embodiments are based on an objective to train the control polices in a simulated environment as the simulated environment include simulated full state data that can be used to train the control policies efficiently.

FIG. 7C is a reward algorithm 700c for training the recovery control policies of the set of recovery control policies, in accordance with one or more example embodiments.

At 721, the processor 103 is further configured to execute an environment step function denoted as STEP(s,a) for training the recovery control policies of the set of recovery control policies. Further, s is a state of the robotic manipulator 115 and the recovery action generated by the recovery control policy of the set of recovery control policies.

At 723, the processor 103 is further configured to determine whether the generated recovery action is the switch-to-nominal action or not. If the generated recovery action is the switch-to-nominal action then, at 725, the set of nominal control policies are executed as a chain to transition the robotic manipulator 115 to the termination state region 131.

However, if the generated recovery action is not the switch-to-nominal action, then, at 727, then at generated recovery action is executed to change the state the state of the robotic manipulator 115. Further, the recovery policy reward is generated corresponding to the change in the state of the robotic manipulator 115. Accordingly a schematic is provided with reference to FIG. 8 for the training of control polices based on the policy learning algorithm 700a, a skill learning algorithm 700b, and the reward algorithm 700c.

Figure 8A:
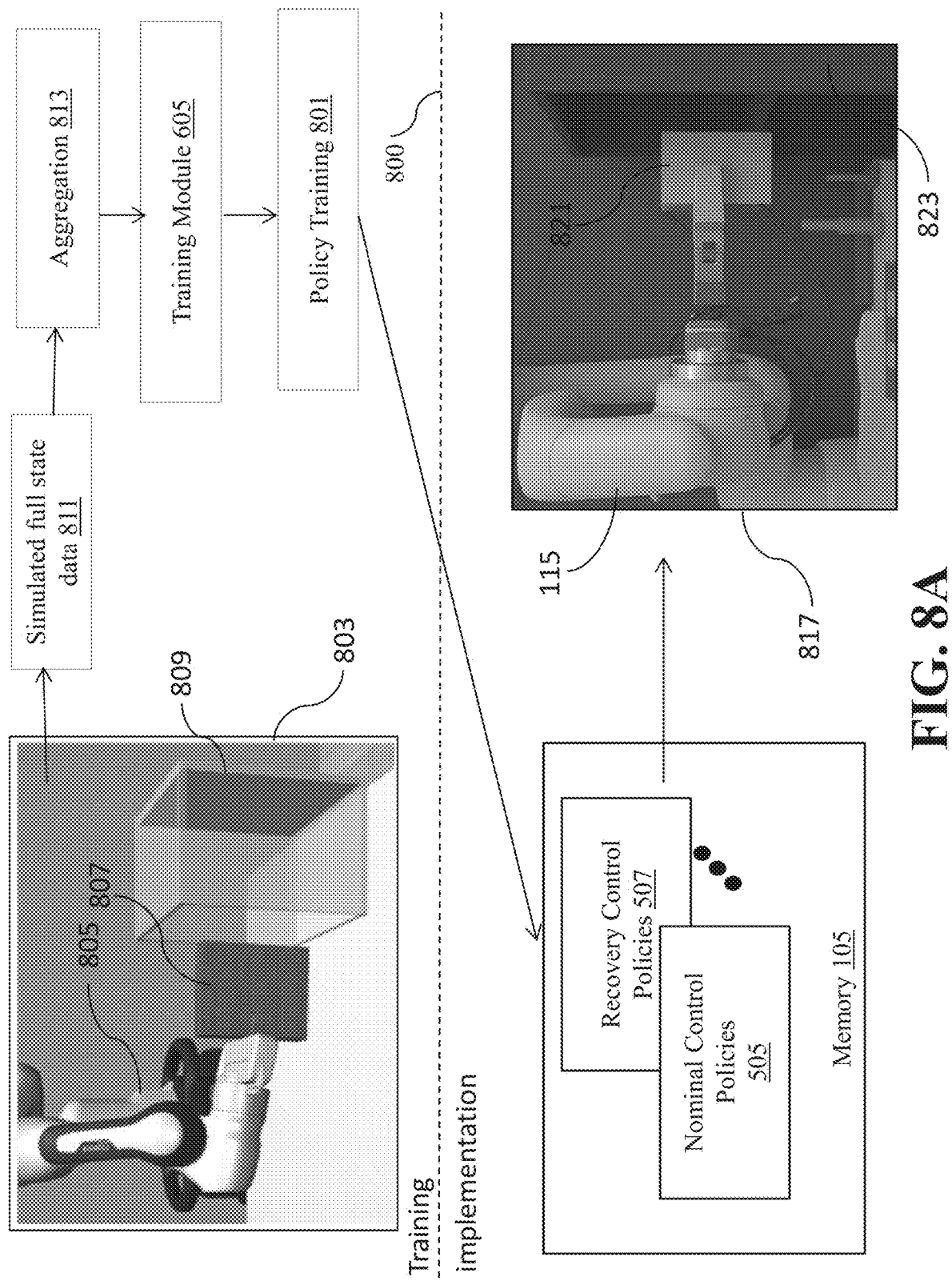
FIG. 8A illustrates a schematic that illustrates an example embodiment of policy training of the control policies in a simulated environment, in accordance with one or more example embodiments.

FIG. 8A illustrates a schematic that illustrates an example embodiment of policy training 1101 of the control policies in a simulated environment 803, in accordance with one or more example embodiments. As shown there is a training portion above line 800 and an implementation portion below line 800. The simulated environment 801 may correspond to a simulated robotic manipulator 805 and robotic manipulator's surrounding associated with a book placing task. The robotic manipulator's surrounding includes a simulated object 807 and a simulated bookshelf 809.

The processor 103 is further configured to obtain the simulated full state data 811 of the simulated environment 801. The simulated full state data 811 includes simulated robotic manipulator data, simulated object data, and simulated goal data. The simulated robotic manipulator data include, but are not limited to, joint position data, orientations data, mass distribution data, inertia data, friction data, control signal data, sensor data, end effector data, collision data, environmental constraints data, and simulation parameter data.

The simulated object data may include, but are not limited to, geometry data, dimensions data, mass data, density data, material data, surface texture data, color data, object pose data, object orientation data, and the like.

The simulated goal data may include, but are not limited to, goal position data, for example, bookshelf position data, goal orientation data, for example, bookshelf orientation data, and the like.

The processor 103 is further configured to perform aggregation 813 on the simulated full state data 811. Further, based on the aggregated simulated full state data, the training module 605 is further configured to perform the policy training 801. Further, the processor 103 is further configured to perform the book placing task in a real environment 817. In some embodiments, the processor 103 is further configured to control the robotic manipulator 115 to place a book 821 in the bookshelf 823. Accordingly, a schematic is provided with reference to FIG. 8B.

Figure 8B:
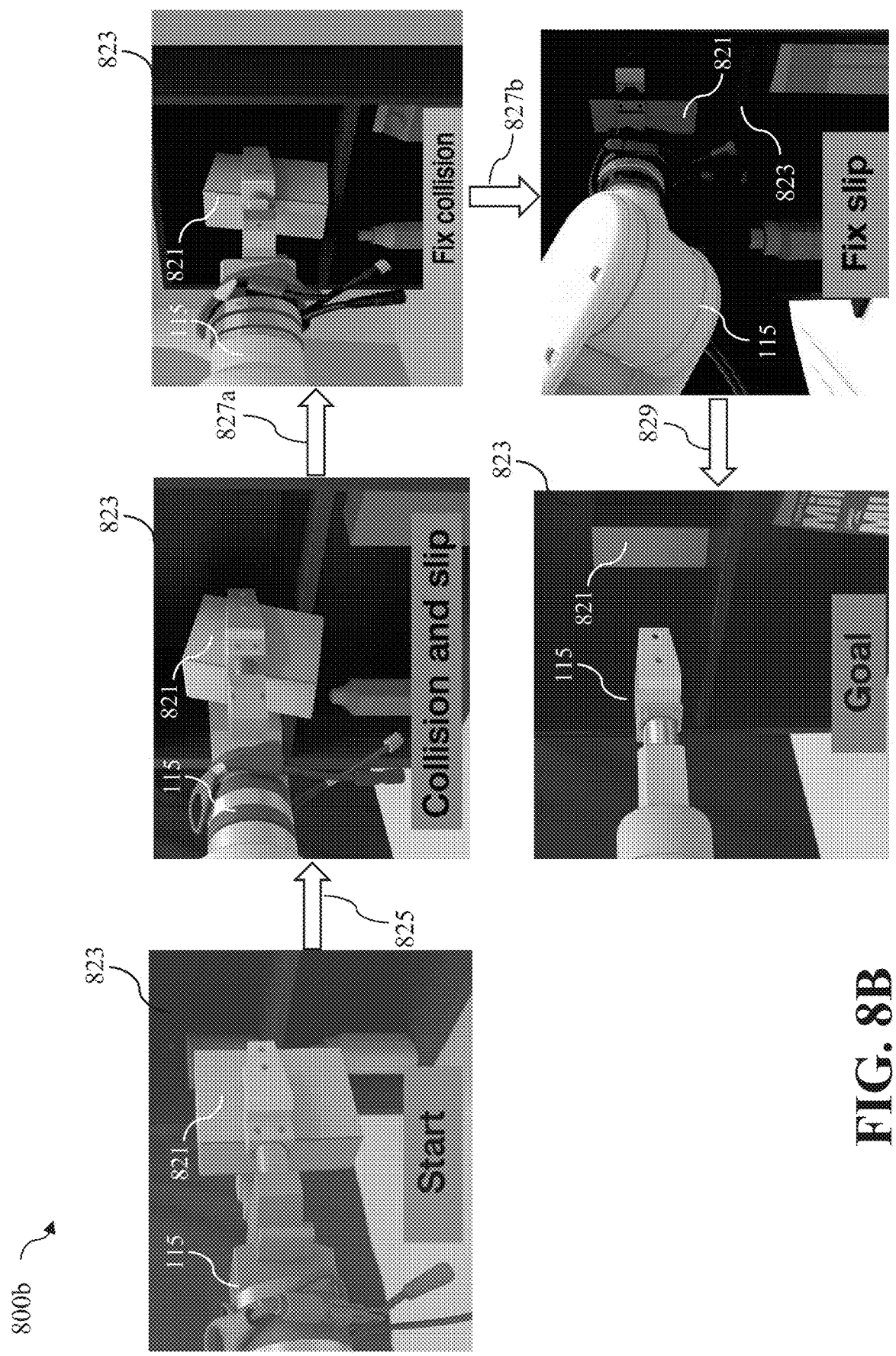
FIG. 8B illustrates a schematic that illustrates an example embodiment of an implementation of the control polices in the real environment, in accordance with one or more example embodiments.

FIG. 8B illustrates a schematic 800b that illustrates an example embodiment of an implementations of the control polices in the real environment 817, in accordance with one or more example embodiments. As shown by FIG. 8B, the high level policy 109a is further configured to execute 825 the nominal control policy 109b to perform the book placing task. However, due to partial observable states associated with the real environment 817, the robotic manipulator 115 encounters the failures, for example, the collision and slips. Further, the high level policy 109a is further configured to execute 827a, the recovery control policy 109c to mitigate the collision in the first control iteration. Further, the high level policy 109a is further configured to execute 827b, the recovery control policy 109c to mitigate the slip in the second control iteration. Further, the high level policy 109a is further configured to map the measurement to the generated switch-to-nominal action selected from the augmented action space 133. Further, the processor 103 is further configured to execute 829, based on the switch-to-nominal action, the nominal control policy 109b to place the book 821 in the bookshelf 823.

Figure 9:
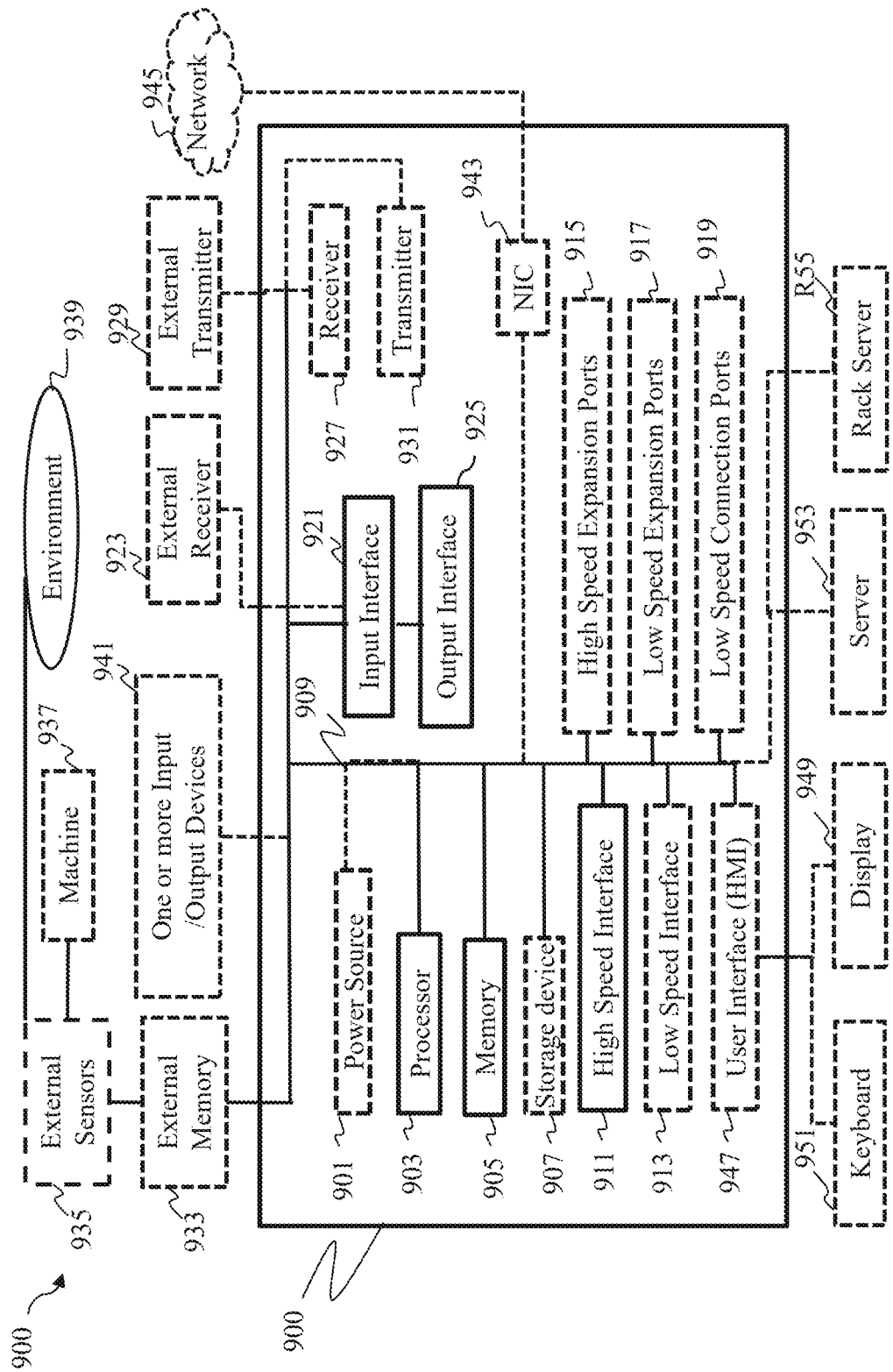
FIG. 9 is a schematic illustrating a computing device for various embodiments of the present disclosure.

FIG. 9 is a schematic illustrating a computing device 900 for various embodiments of the present disclosure. The computing device 900 includes a power source 901, a processor 903, a memory 905, a storage device 907, all connected to a bus 909. Further, a high-speed interface 911, a low-speed interface 913, high-speed expansion ports 915 and low speed connection ports 917, can be connected to the bus 909. In addition, a low-speed expansion port 919 is in connection with the bus 909. Further, an input interface 921 can be connected via the bus 909 to an external receiver 923 and an output interface 925. A receiver 927 can be connected to an external transmitter 929 and a transmitter 931 via the bus 909. Also connected to the bus 909 can be an external memory 933, external sensors 935, machine(s) 937, and an environment 939. Further, one or more external input/output devices 941 can be connected to the bus 909. A network interface controller (NIC) 943 can be adapted to connect through the bus 909 to a network 945, wherein data or other data, among other things, can be rendered on a third-party display device, third party imaging device, and/or third-party printing device outside of the computing device 900.

The memory 905 can store instructions that are executable by the computing device 900 and any data that can be utilized by the methods and systems of the present disclosure. The memory 905 can include random access memory (RAM), read only memory (ROM), flash memory, or any other suitable memory systems. The memory 905 can be a volatile memory unit or units, and/or a non-volatile memory unit or units. The memory 905 may also be another form of computer-readable medium, such as a magnetic or optical disk.

The storage device 907 can be adapted to store supplementary data and/or software modules used by the computer device 900. The storage device 907 can include a hard drive, an optical drive, a thumb-drive, an array of drives, or any combinations thereof. Further, the storage device 907 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 903), perform one or more methods, such as those described above.

The computing device 900 can be linked through the bus 909, optionally, to a display interface or user Interface (HMI) 947 adapted to connect the computing device 900 to a display device 949 and a keyboard 951, wherein the display device 949 can include a computer monitor, camera, television, projector, or mobile device, among others. In some implementations, the computer device 900 may include a printer interface to connect to a printing device, wherein the printing device can include a liquid inkjet printer, solid ink printer, large-scale commercial printer, thermal printer, UV printer, or dye-sublimation printer, among others.

The high-speed interface 911 manages bandwidth-intensive operations for the computing device 900, while the low-speed interface 913 manages lower bandwidth-intensive operations. Such allocation of functions is an example only. In some implementations, the high-speed interface 911 can be coupled to the memory 905, the user interface (HMI) 949, and to the keyboard 951 and the display 949 (e.g., through a graphics processor or accelerator), and to the high-speed expansion ports 915, which may accept various expansion cards via the bus 909. In an implementation, the low-speed interface 913 is coupled to the storage device 907 and the low-speed expansion ports 917, via the bus 909. The low-speed expansion ports 917, which may include various communication ports (e.g., USB, Bluetooth, Ethernet, wireless Ethernet) may be coupled to the one or more input/output devices 941. The computing device 900 may be connected to a server 953 and a rack server 955. The computing device 900 may be implemented in several different forms. For example, the computing device 900 may be implemented as part of the rack server 955.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A feedback controller for controlling a robotic manipulator to perform a task, comprising:
   a user interface configured to collect a feedback signal indicative of measurements of a state of the robotic manipulator performing the task;
   a memory configured to store a hierarchical reinforcement learning (HRL) neural network including (i) a nominal control policy trained to generate, based on the feedback signal, a nominal action transitioning the robotic manipulator in a precondition state region to a termination state region of the task and (ii) a recovery control policy trained to generate, based on at least a portion of the feedback signal, a recovery action transitioning the robotic manipulator in a failure state region to the precondition state region of the nominal control policy, wherein the recovery control policy is trained based on a recover policy reward to generate a switch-to-nominal action to transfer control to the nominal control policy to perform the task, wherein the recovery policy reward for training the recovery control policy is dependent on a nominal policy reward for training the nominal control policy; and
   a processor configured to:
      iteratively execute the HRL neural network to generate an action from at least one of: the nominal action or the recovery action; and
      cause to control the robotic manipulator to perform the task based on the generated action.

2. The feedback controller of claim 1, wherein the nominal control policy is further configured to map the measurements of the state of the robotic manipulator to the generated nominal action selected from a set of skill actions defining an action space of the robotic manipulator.

3. The feedback controller of claim 2, wherein the processor is further configured to augment, based on the switch-to-nominal action, the set of skill actions to determine an augmented action space of the robotic manipulator.

4. The feedback controller of claim 3, wherein the recovery control policy is configured to map at least a portion of the measurements of the state of the robotic manipulator to the generated recovery action selected from the augmented action space of the robotic manipulator.

5. The feedback controller of claim 1, wherein the processor is further configured to determine the recovery policy reward associated with the recovery action based on the nominal policy reward generated corresponding to the transitioning of the robotic manipulator to the termination state region from the precondition state region, wherein the robotic manipulator is transitioned in the precondition state region based on the recovery action.

6. The feedback controller of claim 1, wherein the processor is further configured to determine, based on a value function corresponding to the nominal control policy, failure states associated with the failure state region during training of the HRL neural network.

7. The feedback controller of claim 6, wherein the processor is further configured to determine, based on the value function corresponding to the nominal control policy, the nominal policy reward.

8. The feedback controller of claim 1, wherein a state action space of the robotic manipulator includes (i) a plurality of failure state regions, and (ii) a plurality of precondition state regions.

9. The feedback controller of claim 1, wherein the HRL neural network includes a plurality of recovery control policies, wherein a respective recovery control policy of the plurality of recovery control policies is trained for a failure state region of the plurality of failure state regions.

10. The feedback controller of claim 1, wherein the HRL neural network includes a plurality of nominal control policies, wherein a respective nominal control policy of the plurality of nominal control policies is trained for a precondition state region of the plurality of precondition state regions.

11. The feedback controller of claim 1, wherein the recovery control policy is trained to generate a plurality of switch-to-nominal actions, wherein a respective switch-to-nominal action is generated for a nominal control policy of the plurality of nominal control policies.

12. The feedback controller of claim 1, wherein the HRL neural network includes a high-level policy trained to iteratively select and execute at least one of: the nominal control policy or the recovery control policy.

13. The feedback controller of claim 12, wherein the high-level policy is configured to select the nominal control policy in response to at least one of (i) the nominal control policy generating the nominal action that transitions the robotic manipulator in the termination state region or (ii) in response to the recovery control policy generating the switch-to-nominal action transferring control to the nominal control policy.

14. The feedback controller of claim 12, wherein the high-level policy is configured to select the recovery control policy in response to at least one of (i) the nominal control policy generating the nominal action that transitions the robotic manipulator in the failure state region and (ii) the recovery control policy generating an action different from the switch-to-nominal action.

15. The feedback controller of claim 12, wherein the high-level policy is configured to:
   iteratively execute at least one of: the nominal control policy or the recovery control policy;
   switch the execution of the nominal control policy to the execution of the recovery control policy in response to the measurements of the state of the robotic manipulator indicating that the robotic manipulator is within a fault state region; and
   switch the execution of the recovery control policy to the execution of the nominal control policy in response to the recovery control policy generating the switch-to-nominal action.

16. The feedback controller of claim 1, wherein the feedback signal includes observation data indicative of visual observations and proprioception observations associated with the robotic manipulator.

17. The feedback controller of claim 16, wherein the nominal control policy is trained to generate, based on the visual observations and the proprioception observations, the nominal action transitioning the robotic manipulator in the precondition state region to the termination state region of the task.

18. The feedback controller of claim 16, wherein the recovery control policy trained to generate, based on the proprioception observations, the recovery action transitioning the robotic manipulator in the failure state region to the precondition state region of the nominal control policy.

19. The feedback controller of claim 1, wherein the set of skill actions includes at least one of: an up move action, a left move action, a right move action, a down move action, a coordinate move action, a pick object action, a stop move action, a rotate action, and a reset position action.

20. The feedback controller of claim 1, wherein the HRL neural network further includes a policy hierarchy, wherein the nominal control policy is dominant over the recovery control policy in the policy hierarchy, wherein the recovery control policy is a subtask of the nominal control policy.

21. The feedback controller of claim 1, wherein the processor is further configured to iteratively execute the HRL neural network, based on the state of the robotic manipulator in the precondition state region, to generate a plurality of actions corresponding to a long horizon period of execution time associated with the task.

22. The feedback controller of claim 21, wherein the processor is further configured to determine, based on a comparison of an anticipated execution time associated with the task with a predetermined threshold, the long horizon period of execution time associated with the task.

* * * * *